US012213629B2

(12) United States Patent
Fukuba et al.

(10) Patent No.: US 12,213,629 B2
(45) Date of Patent: *Feb. 4, 2025

(54) MODULAR SYSTEM FOR FOOD ASSEMBLY

(71) Applicant: Hyphen Technologies, Inc., San Jose, CA (US)

(72) Inventors: Daniel Fukuba, San Jose, CA (US);
Erik Norris, Redwood City, CA (US);
Maneesh Jain, San Jose, CA (US);
Mark Manfrey, San Jose, CA (US);
John Vassa, Nazareth, PA (US);
Keegan Schoch, Nazareth, PA (US)

(73) Assignee: Hyphen Technologies, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/424,497

(22) Filed: Jan. 26, 2024

(65) Prior Publication Data
US 2024/0164588 A1 May 23, 2024

Related U.S. Application Data

(63) Continuation-in-part of application No. 17/494,736, filed on Oct. 5, 2021.
(Continued)

(51) Int. Cl.
*A47J 44/00* (2006.01)
*A47J 39/00* (2006.01)
(Continued)

(52) U.S. Cl.
CPC ............. *A47J 44/00* (2013.01); *A47J 39/003* (2013.01); *A47J 39/02* (2013.01); *A47J 47/01* (2013.01); *B65G 15/22* (2013.01); *A47J 2202/00* (2013.01)

(58) Field of Classification Search
CPC ...... A47J 27/004; A47J 36/165; A47J 43/046; A47J 27/002; A47J 43/044; A47J 43/082;
(Continued)

(56) References Cited

U.S. PATENT DOCUMENTS

| 4,167,900 A * | 9/1979 | Eichler | A47J 37/0611 99/332 |
| 2005/0206282 A1 * | 9/2005 | Walburn | A47B 46/005 312/312 |

(Continued)

*Primary Examiner* — Eric S Stapleton
*Assistant Examiner* — Yeong Juen Thong
(74) *Attorney, Agent, or Firm* — Run8 Patent Group, LLC; Peter Miller; Leah Raddatz

(57) ABSTRACT

One variation of a food production system includes a module housing: supporting a food preparation surface located at work surface height; configured to transiently house a food-dispensing module configured to dispense an ingredient toward the first autonomous assembly zone; including a positioner module arranged within the autonomous assembly zone and configured to transiently locate a food container below the food-dispensing module for dispensation of the ingredient into the food container; including a window arranged on a front side of the module housing and configured to enable user access to the autonomous assembly zone. The food production system further includes a controller configured to: receive a food order; coordinate motion of the positioner module to locate the food container below the food-dispensing module; and selectively trigger the food-dispensing module to dispense the ingredient into the food container to assemble a unit of a food product according to the food order.

20 Claims, 10 Drawing Sheets

Related U.S. Application Data

(60) Provisional application No. 63/521,042, filed on Jun. 14, 2023, provisional application No. 63/441,406, filed on Jan. 26, 2023, provisional application No. 63/087,662, filed on Oct. 5, 2020.

(51) Int. Cl.
*A47J 39/02* (2006.01)
*A47J 47/01* (2006.01)
*B65G 15/22* (2006.01)

(58) Field of Classification Search
CPC ............... A47J 27/00; A47J 43/0727; A47J 2043/04454; A47J 27/14; A47J 36/06; A47J 36/2483; A47J 36/26; A47J 36/32; A47J 36/34; A47J 37/047; A47J 43/042; A47J 43/06; A47J 43/0716; A47J 43/087; A47J 44/00; A47J 2043/04463; A47J 31/60; A47J 36/321; A47J 37/105; A47J 43/04; A47J 43/0766; A47J 43/0772; A47J 43/0777; A47J 43/08; A47J 43/085; A47J 36/00; A47J 2027/043; A47J 43/0722; G06Q 50/12; G06Q 30/06; G06Q 10/087; G06Q 20/18; G07F 17/0085; B60P 3/0257; B65D 83/06; B65D 25/38; B65D 47/04; G06F 40/30; A47F 1/035; B25J 9/0096; B25J 9/1602; B25J 9/161; B25J 9/1661; B25J 11/0045; B25J 13/006; B25J 15/0608; B65G 65/4881; B65G 3/04; G01F 11/261; G01G 13/026; G05B 19/4147; G05B 2219/40; A47G 19/34; B67D 1/0041; B67D 2210/00076; B67D 2210/00144
USPC ......... 99/325, 326, 331, 337, 338, 342, 352, 99/357, 427, 523, 468, 486, 280, 356, 99/390, 494, 448–449, 516; 219/752–753, 762–763
See application file for complete search history.

(56) References Cited

U.S. PATENT DOCUMENTS

| | | | |
|---|---|---|---|
| 2005/0279228 A1* | 12/2005 | Julian | B26D 7/0641 99/537 |
| 2012/0185086 A1* | 7/2012 | Khatchadourian | G07F 11/70 99/345 |
| 2015/0290795 A1* | 10/2015 | Oleynik | B25J 9/0081 700/257 |
| 2016/0213053 A1* | 7/2016 | Frehn | A23L 5/10 |
| 2018/0070776 A1* | 3/2018 | Ganninger | A21C 9/08 |
| 2019/0069728 A1* | 3/2019 | Alfarra | A23N 12/02 |
| 2020/0012322 A1* | 1/2020 | Jan | E05D 3/18 |
| 2022/0118605 A1* | 4/2022 | Ishizu | B25J 9/0096 |

* cited by examiner

MODULAR SYSTEM FOR FOOD ASSEMBLY

CROSS-REFERENCE TO RELATED APPLICATIONS

This application claims the benefit of U.S. Provisional Application No. 63/521,042, filed on 14 Jun. 2023, and U.S. Provisional Application No. 63/441,406, filed on 26 Jan. 2023, each of which is incorporated in its entirety by this reference.

This application is also a continuation-in-part of U.S. patent application Ser. No. 17/494,736, filed on 5 Oct. 2021, which claims the benefit of U.S. Provisional Application No. 63/087,662, filed on 5 Oct. 2020, each of which is incorporated in its entirety by this reference.

TECHNICAL FIELD

This invention relates generally to the field of food production and more specifically to a new and useful modular system for manual and autonomous food assembly in the field of food production.

DESCRIPTION OF THE EMBODIMENTS

Figure 1A:
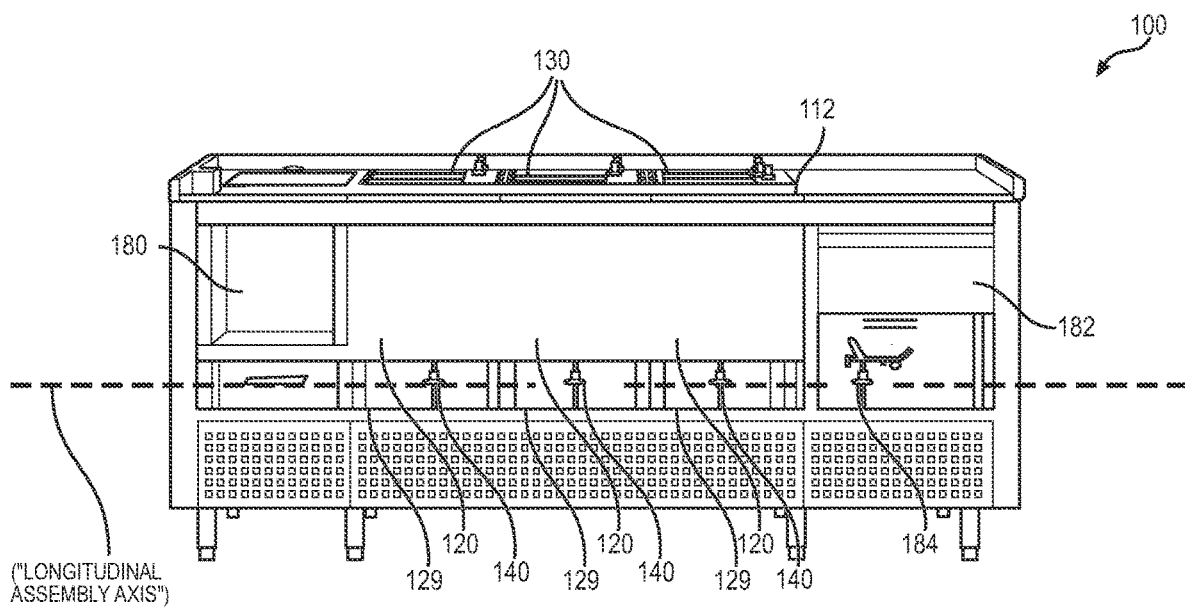
FIGS. 1A and 1B are schematic representation of a food production system.
Figure 1B:
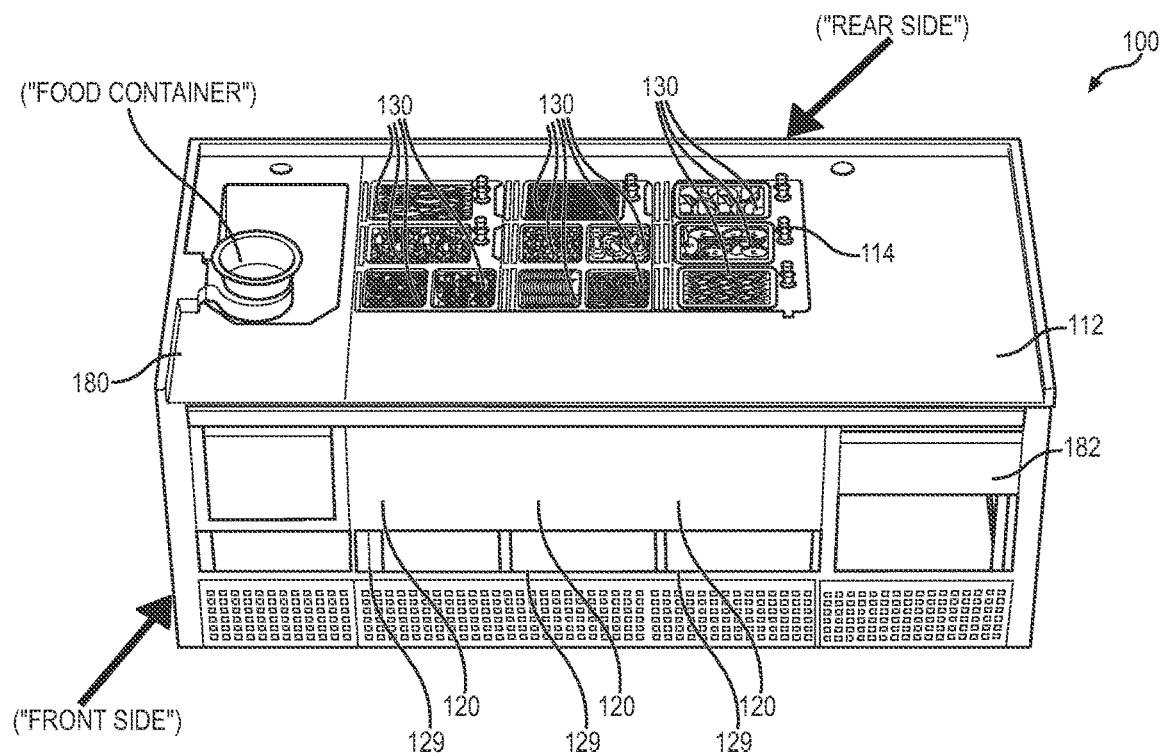

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Food Production System

As shown in FIGS. 1A, 1B, 2A, 2B, 3, 4, 5, 6A, 6B, 7A, 7B, and 10, a food production system 100 for assembling units of a food product type includes: a food preparation surface 112 at work surface height and defining a receptacle 114 configured to receive food-dispensing modules 130 configured to transiently store and dispense ingredients for preparation of units of a food product type; a first module housing 120 supporting the food preparation surface 112; a second module housing 120 supporting the food preparation surface 112; and a controller 160.

The first module housing: defines a first autonomous assembly zone 122 extending along a longitudinal assembly axis; is configured to transiently house a first food-dispensing module 130 located below the food preparation surface 112 and along a rear side of the first module housing 120, the first food-dispensing module 130 configured to dispense a first ingredient toward the first autonomous assembly zone 122; is configured to transiently house a cooling module 152 within a first infrastructure slot 126 arranged below the food preparation surface 112, the first cooling module 152 configured to regulate temperatures of ingredients in the first food-dispensing module 130 within a first temperature range; includes a first positioner module 140 arranged within the first autonomous assembly zone 122 and configured to transiently locate a food container below the first food-dispensing module 130 for dispensation of the first ingredient into the food container; and includes a first window 129 arranged along a front side of the first module housing 120, opposite the rear side, adjacent the first autonomous assembly zone 122 and configured to provide user access to the first autonomous assembly zone 122.

The second module housing: defines a second autonomous assembly zone 122 extending along the longitudinal assembly axis; is configured to transiently house a second food-dispensing module 130 located below the food preparation surface 112 and along a rear side of the second module housing 120, the second food-dispensing module 130 configured to dispense a second ingredient toward the second autonomous assembly zone 122; is configured to transiently house a heating module 154 within a second infrastructure slot 126 arranged below the food preparation surface 112, the heating module 154 configured to regulate temperatures of ingredients in the second food-dispensing module 130 within a second temperature range, temperatures in the second temperature range exceeding temperatures in the first temperature range; includes a second positioner module 140 arranged within the second autonomous assembly zone 122 and configured to transiently locate the food container below the second food-dispensing module 130 for dispensation of the second ingredient into the food container; and includes a second window 129 arranged along a front side of the second module housing 120, opposite the rear side, adjacent the second autonomous assembly zone 122 and configured to provide user access to the second autonomous assembly zone 122.

The controller 160 is configured to: receive a food order; coordinate motion of the first positioner module 140 and the second positioner module 140 to locate the food container below food-dispensing modules 130 according to the food order; selectively trigger the set of food-dispensing modules 130 to dispense amounts of ingredients into the food container to assemble a unit of the food product type according to the food order.

In one variation, the food production system 100 includes: a food preparation surface 112 at work surface height and defining a receptacle 114 configured to receive food-dispensing modules 130 configured to transiently store and dispense ingredients for preparation of units of a food product type; a first module housing 120 supporting the food preparation surface 112; and a controller 160.

The first module housing: defines a first autonomous assembly zone 122 extending along a longitudinal assembly axis; is configured to transiently house a first food-dispensing module 130 located below the food preparation surface 112 and along a rear side of the first module housing 120, the first food-dispensing module 130 configured to dispense a first ingredient toward the first autonomous assembly zone 122; is configured to transiently house a cooling module 152 within a first infrastructure slot 126 arranged below the food preparation surface 112, the first cooling module 152 configured to regulate temperatures of ingredients in the first food-dispensing module 130 within a first temperature range; includes a first positioner module 140 arranged within the first autonomous assembly zone 122 and configured to transiently locate a food container below the first food-dispensing module 130 for dispensation of the first ingredient into the food container; includes a flexible tray 142 configured to transiently install below the first autonomous assembly zone 122 within the first module housing 120; and includes a first window 129 arranged along a front side of the first module housing 120, opposite the rear side, adjacent the first autonomous assembly zone 122 and configured to provide user access to the first autonomous assembly zone 122 for removal and installation of the flexible tray 142. In this variation, the controller 160 is configured to: receive a food order; coordinate motion of the first positioner module 140 to selectively locate the food container below food-dispensing modules 130, in the first set of food-dispensing modules 130, according to the food order; and selectively trigger the set of food-dispensing modules 130 to dispense amounts of ingredients into the food container to assemble a unit of the food product type according to the food order.

In yet another variation, the food production system 100 includes: a first module housing 120 supporting a food preparation surface 112 located at a work surface height and defining a receptacle 114 configured to receive food-dispensing modules 130 configured to transiently store and dispense ingredients for preparation of units of a food product type; and a controller 160. The first module housing 120 defines: a first autonomous assembly zone 122 extending along a longitudinal assembly axis; a dispenser slot 124 coextensive the receptacle 114, arranged vertically above the first autonomous assembly zone 122, and configured to transiently house a first food-dispensing module 130 configured to dispense units of a first ingredient toward the first autonomous assembly zone 122; and an infrastructure slot 126 laterally offset the longitudinal assembly axis, arranged proximal a front side of the first module housing 120, configured to transiently house a cooling module 152 configured to cool ingredients in the first food-dispensing module 130, and defining an inlet region intersecting the autonomous assembly zone 122. The first module housing 120 includes: a first positioner module 140 arranged within the first autonomous assembly zone 122 and configured to transiently locate a food container below the first food-dispensing module 130 for dispensation of the first ingredient into the food container; and a window 129 arranged on the front side of the first module housing 120, aligned with the inlet region, and configured to enable user access to the autonomous assembly zone 122 via the inlet region. In this variation, the controller 160 is configured to: receive a food order; coordinate motion of the first positioner module 140 to locate the food container below the first food-dispensing module 130 according to the food order; and selectively trigger the first food-dispensing module 130 to dispense amounts of the first ingredient into the food container to assemble a unit of the food product type according to the food order

1.1 Variation: Food Production System—Remote Refrigeration Module

As shown in FIGS. 1A, 1B, 2A, 2B, 3, 4, 5, 6A, 6B, 7A, 7B, 8A, 8B, 9A, 9B, and 10, one variation of the food production system 100 for assembling units of a food product type includes: a manual assembly zone 110; an autonomous assembly zone 122; and a controller 160.

The manual assembly zone no includes: a food preparation surface 112 configured for manual preparation of food products and located at a work surface height; and a receptacle 114 configured to receive a sequence of food hoppers transiently located atop a rear side of the food preparation surface 112 and configured to store ingredients for manual preparation of units of the food product type.

The food production system 100 includes a sequence of module housings 120: arranged below the food preparation surface 112; defining a target footprint; including a container module housing 180 configured to transiently receive a set of container-dispenser modules configured to selectively dispense food containers onto a positioner module 140 based on food orders received from patrons; including a refrigeration-module housing 186 configured to transiently receive a set of refrigeration modules; and including a sequence of food module housings 120 arranged between the container-module housing 120 and the refrigeration-module housing 120 and configured to transiently house a sequence of food-dispensing modules 130.

Each food module housing 120, in the sequence of food module housings 120, includes: a dispenser slot 124 extending below (e.g., center below) the receptacle 114 of the food production system 112 and configured to transiently house a set of food-dispensing modules 130 (e.g., one food-dispensing module 130, two food-dispensing modules 130, six food-dispensing modules 130) and transiently dispense ingredients, in the set of ingredients, toward the food container arranged within the autonomous assembly zone 122; an infrastructure slot 126: located below a front side of the food preparation surface 112 and configured to transiently receive a temperature-regulating module 150 configured to regulate temperature of ingredients in the set of ingredients according to a target temperature defined for the set of ingredients; and a positioner slot 128 located below the dispenser slot 124 and configured to transiently receive a unit of a positioner module 140 configured to transfer the food container along the sequence of food-dispensing modules 130 for dispensation of ingredients into the food container. The controller 160 is configured to receive a set of food orders and selectively trigger food-dispensing modules 130, in the sequence of food-dispensing modules 130, to dispense volumes of corresponding ingredients to assemble units of the food product type according to the set of food orders.

2. Applications

Generally, the food production system 100 defines a reconfigurable chassis for on-demand food production and includes: a manual assembly zone 110 defining a food preparation surface 112 supporting manual construction of units of a food product by a worker (e.g., an employee); a sequence of module housings 120 supporting the food preparation surface 112, defining an autonomous assembly zone 122 located beneath the food preparation surface 112, and configured to transiently house a sequence of food-dispensing modules 130 configured to store and dispense amounts of ingredients into a food container within the autonomous assembly zone 122 to autonomously construct units of a food product; and a controller 160. For example, the food production system 100 can autonomously assemble generic units of the same food type within the autonomous assembly zone 122 that is manually assembled and customized by the worker at the food preparation surface 112 within the manual assembly zone 110.

In particular, the modular food production system 100 includes: a sequence of module housings 120 arranged in a particular order and forming a reconfigurable makeline for production of food products according to food orders submitted by patrons; a population of food-dispensing modules 130 configured to transiently (i.e., temporarily) install in module housings 120 designated for food-handling, to be loaded with ingredients, and to dispense volumes or units of ingredients; a set of infrastructure modules configured to transiently install in module housings 120 or integrated into these module housings 120 and to provide refrigeration, power, and/or controls to each module housing 120 in the sequence of module housings 120; and a positioner module 140 configured to transiently install in each module housing 120 to transport food containers along food-dispensing modules 130 installed in the sequence of module housings 120. In particular, the modular food production system 100 can include populations of various modules—including food-dispensing, infrastructure, and positioner modules 140—that can be assembled and reconfigured over time to produce various types of food products, such as smoothies, cold bowls (e.g., cold salads), hot bowls (e.g., hot rice bowls), cold sandwiches, hot sandwiches, cold wraps, hot wraps (e.g., burrito), desserts, coffee products, etc.

In one implementation, each module housing 120 can be configured to: exhibit a fixed unit dimension defining a fixed width, a fixed length, and a fixed height; and receive food-production modules of standard footprint sizes in a set of module slots—such as including a dispenser slot 124, an infrastructure slot 126, a positioner slot 128, etc.—arranged within the module housing 120. Each module slot, in the set of module slots of the module housing 120, can therefore be configured to locate a particular food-production module (or "module")—such as a food-dispensing module 130, an infrastructure module, and/or a positioner module 140—within the module housing 120 of the fixed unit dimension. The module housing 120 can therefore include these module slots—each configured to transiently receive modules of a particular module type (e.g., food-dispensing, infrastructure, container positioner)—arranged in a particular configuration configured to: minimize the fixed unit dimension of the module housing 120 and thereby reduce a total footprint of the food production system 100; enable rapid installation and/or removal of modules from the module housing 120, such as for cleaning and/or for reconfiguration of the module housing 120; and promote high-throughput production of food products according to food orders submitted by patrons.

Further, each module housing 120, in the sequence of module housings 120, can be reconfigured from the same or similar "base" housing, such that over time these module housings 120 can be reconfigured, removed, and/or rearranged within the food production system 100. Further, each instance of the food production system 100 can be configured to include a particular quantity of module housings 120—arranged in a particular order and loaded with a particular set of modules—tailored to types of ingredients, types of food orders, and/or an available footprint (e.g., within a dining establishment) designated for installation of the instance of the food production system 100.

In one implementation, each module housing 120 can define: a dispenser slot 124—extending below the receptacle 114 and arranged along a rear side of the module housing 120—configured to transiently house a set of food-dispensing modules 130; an autonomous assembly zone 122—extending along a longitudinal assembly axis —arranged beneath the dispenser slot 124; a positioner slot 128 arranged within the autonomous assembly zone 122 and configured to transiently house a positioner module 140 configured to transport a food container along the longitudinal assembly axis and below the set of food-dispensing modules 13o; and an infrastructure slot 126 arranged along a front side (or "food handling side") of the module housing 120—such as facing an operator associated with the food production system 100 and laterally offset the dispenser slot and the autonomous assembly zone 122—and configured to transiently house a cooling module 152 (e.g., an evaporator, a blower, and a compressor) or a heating module 154 (e.g., a heater and a blower). By including the cooling and/or heating modules along the front side of the module housing 120, an operator may easily access these modules (e.g., via removal of a front panel) for servicing and/or replacement. For example, an operator may swap out a cooling module 152 with a heating module 154 or visa versa, without requiring disassembly of the module housing 120 from the food production system 100.

Furthermore, in this implementation, the module housing 120 can include a window 129 arranged on the front side of the module housing 120—such as interposed an upper region of the infrastructure slot 126 and a lower region of the infrastructure slot 126—and defining an inlet region extending into the module housing 120 between the window 129 and the autonomous assembly zone 122. Components of the cooling and/or heating modules can therefore be distributed between the upper and lower regions of the infrastructure slot 126, with electrical and/or fluid connections routed about the window 129 and/or inlet region accordingly. By including this window 129 along the front side, the operator may readily access the autonomous assembly zone 122, such as for cleaning of food debris and/or replacement of the positioner module 140. Furthermore, the operator may install and/or remove a flexible tray 142 (e.g., a drip tray) configured to install beneath the positioner module 140 within the autonomous assembly zone 122 for collection of food debris during actuation of food-dispensing modules 130 within the module housing 120, thereby: reducing exposure of interior surfaces within the module housing 120 to food debris and thus minimizing required cleaning; and simplifying cleaning by enabling the operator to remove this flexible tray 142 for cleaning rather than reach into the autonomous assembly zone 122 (with limited visibility) to clean these interior surfaces.

3. Reconfigurable Makeline

The food production system 100 can be configured to install within a food service establishment (e.g., a "fast-casual" restaurant, a ghost kitchen, a food court, a cafeteria) and can be assembled and reconfigured over time to produce various types of food product, such as smoothies, cold bowls (e.g., cold salads), hot bowls (e.g., hot rice bowls), cold sandwiches, hot sandwiches, cold wraps, hot wraps (e.g., burritos), pizzas, desserts, coffee products, etc.

Once a combination of food-dispensing modules 130 are assembled onto the food production system 100 to construct a particular type of food product, the food production system 100 can be loaded with a control program configured to:

intake food orders from patrons; and to selectively actuate the food-dispensing modules 130 to construct instances of this food product according to these food orders.

The food production system 100 defines a base platform or "chassis" configured to support and locate a combination of food-dispensing modules 130 for fulfillment of food orders. In one implementation, the food production system 100 includes: a chassis (e.g., a rigid platform) defining a food preparation surface 112; and a cabinet—including a sequence of module housings 120—arranged beneath the food preparation surface 112 and configured to house a sequence of food-dispensing modules 130 for fulfillment of food orders; and a sequence of food containers (or "food hoppers")—transiently arranged within the sequence of module housings 120—configured to store ingredients for manual preparation of a food product type on the food preparation surface 112. For example, the food production system 100 can include: a steel box frame configured to support a sequence of food hoppers and food-dispensing modules 130; a food preparation surface 112 (e.g., a stainless steel surface) arranged over a top face of the steel box frame; and a set of legs (e.g., a set of round tubular legs) coupled to a bottom face opposite the top face of the steel box frame and configured to support the steel box frame.

The food production system 100 can include a sequence of food hoppers arranged along a back side of the food preparation surface 112 (e.g., opposite an employee working at the food production system 100 such that these food hoppers are arranged contiguously along a length of the food preparation surface 112 and ordered accordingly to efficiently and satisfactorily complete food orders. The food production system 100 can also include a cabinet: located beneath the food preparation surface 112 and within the steel box frame; including a sequence of module housings 120 configured to transiently house a sequence of food-dispensing modules 130 configured to selectively dispense food ingredients according to food orders received by the food production system 100.

The food production system 100 can define a particular height (e.g., a work height) such that an employee may comfortably stand facing a front side of the food production system 100 while handling food (e.g., adding ingredients to a serving container, preparing ingredients, refilling food hoppers) on the food preparation surface 112 and/or interfacing with a patron. For example, the food production system 100 can exhibit a height—between a ground surface and the food preparation surface 112—approximately (e.g., within two inches) between 35 inches and 42 inches. Furthermore, the bottom surface of the food production system 100 can be offset a ground surface (e.g., the floor) in order to enable cleaning beneath the food production system 100. For example, the food production system 100 can include the set of legs defining a particular height such that: an employee may clean the bottom surface of the food production system 100 and surfaces (e.g., the floor) below the food production system 100; the food preparation surface 112 sits within a working height range (e.g., between 36 and 38 inches); and the cabinet, including a sequence of food-dispensing modules 130, fits between the bottom surface and the food preparation surface 112.

4. Manual Assembly Zone

Figure 2A:
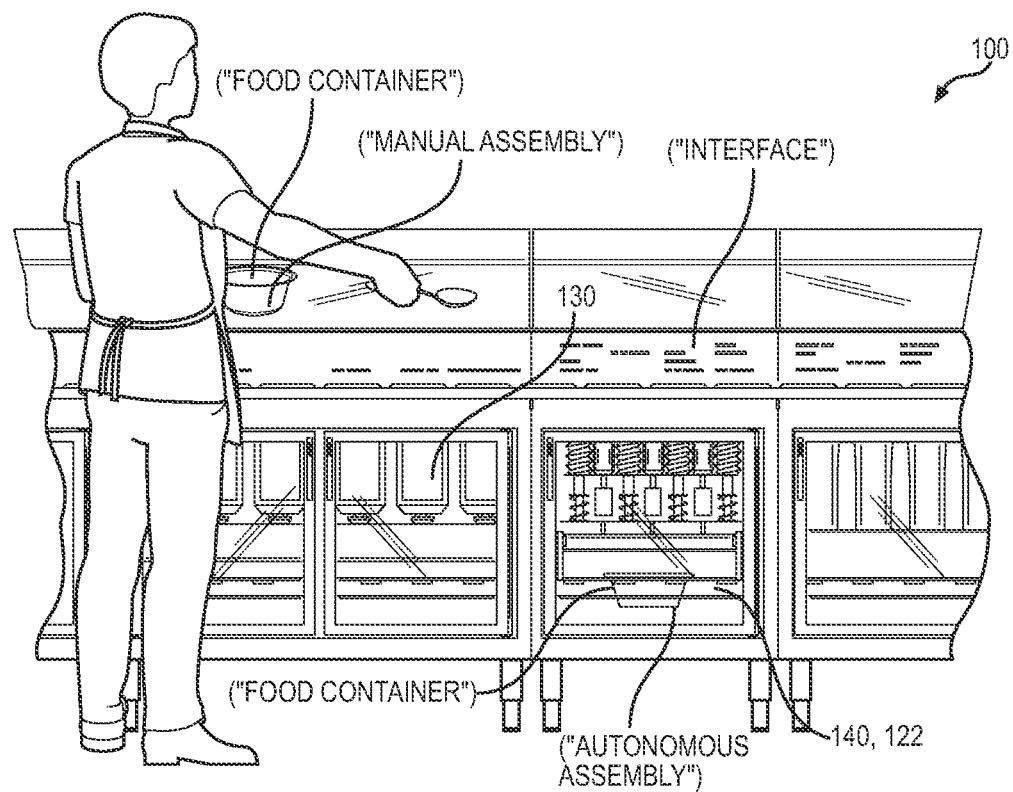
FIGS. 2A and 2B are schematic representations of one variation of the food production system.
Figure 2B:
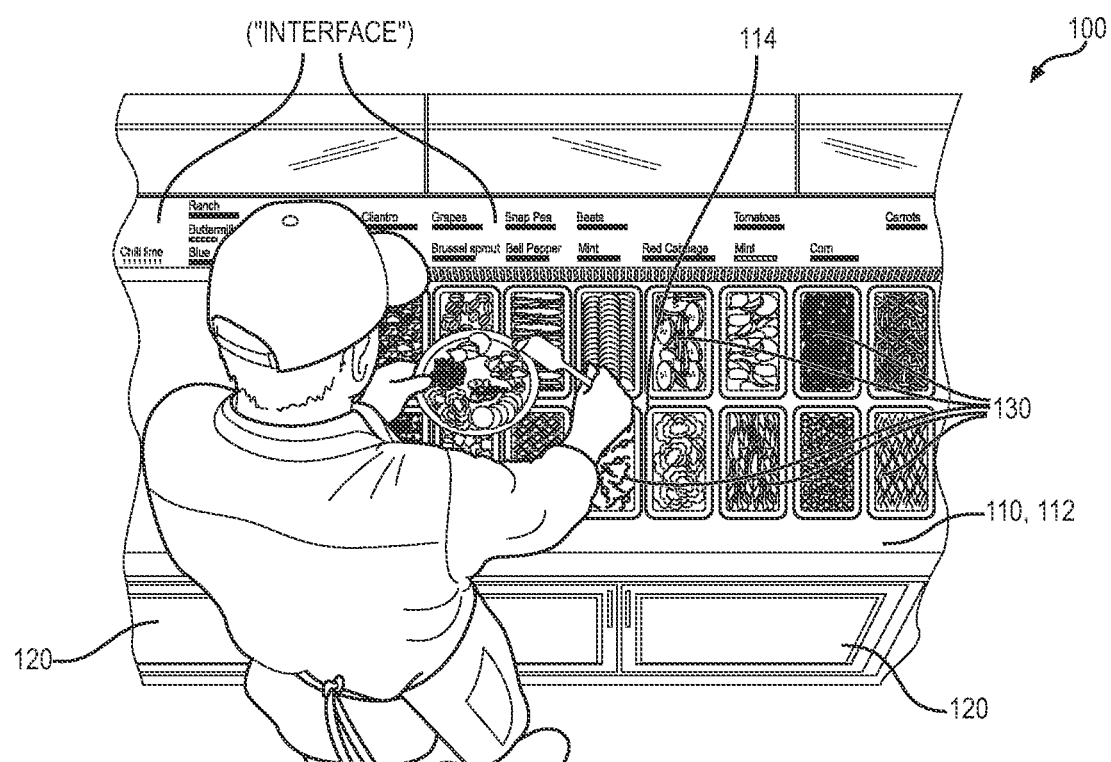
Figure 3:
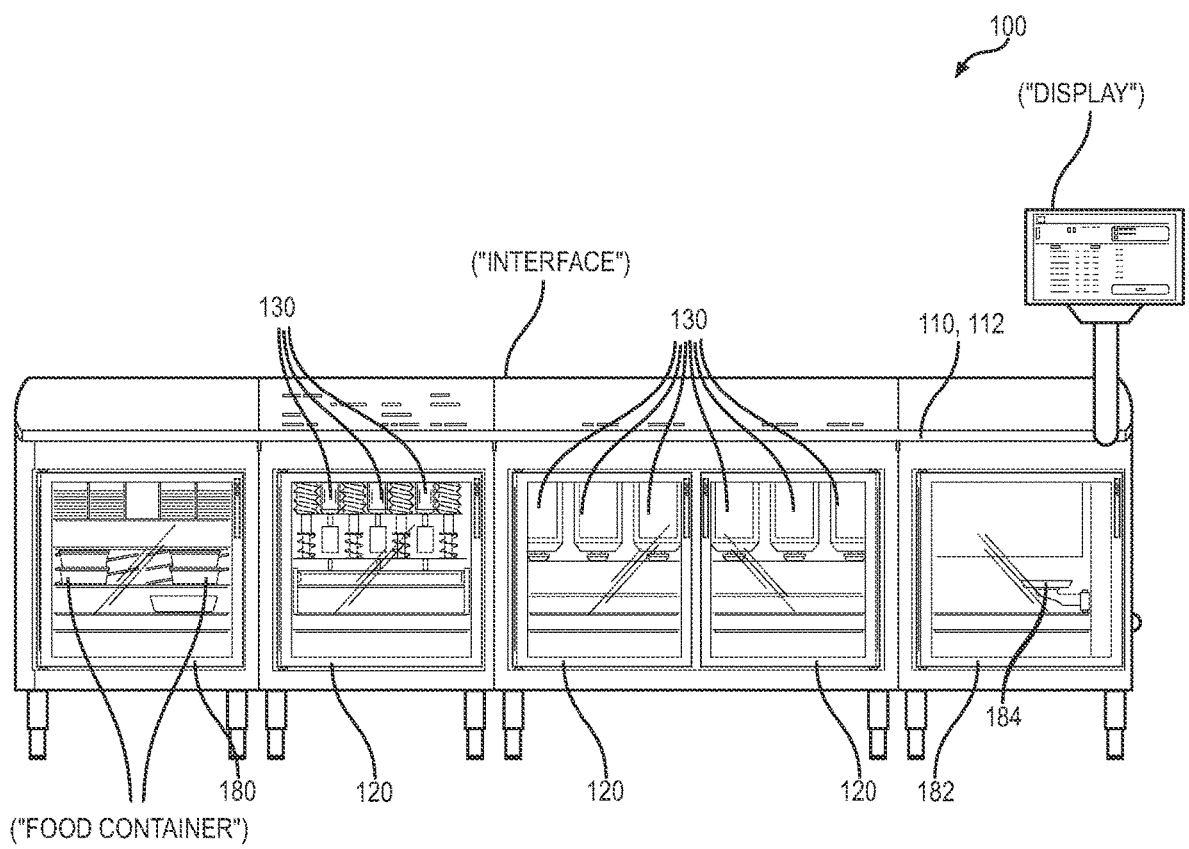
FIG. 3 is a schematic representation of one variation of the food production system.
Figure 4:
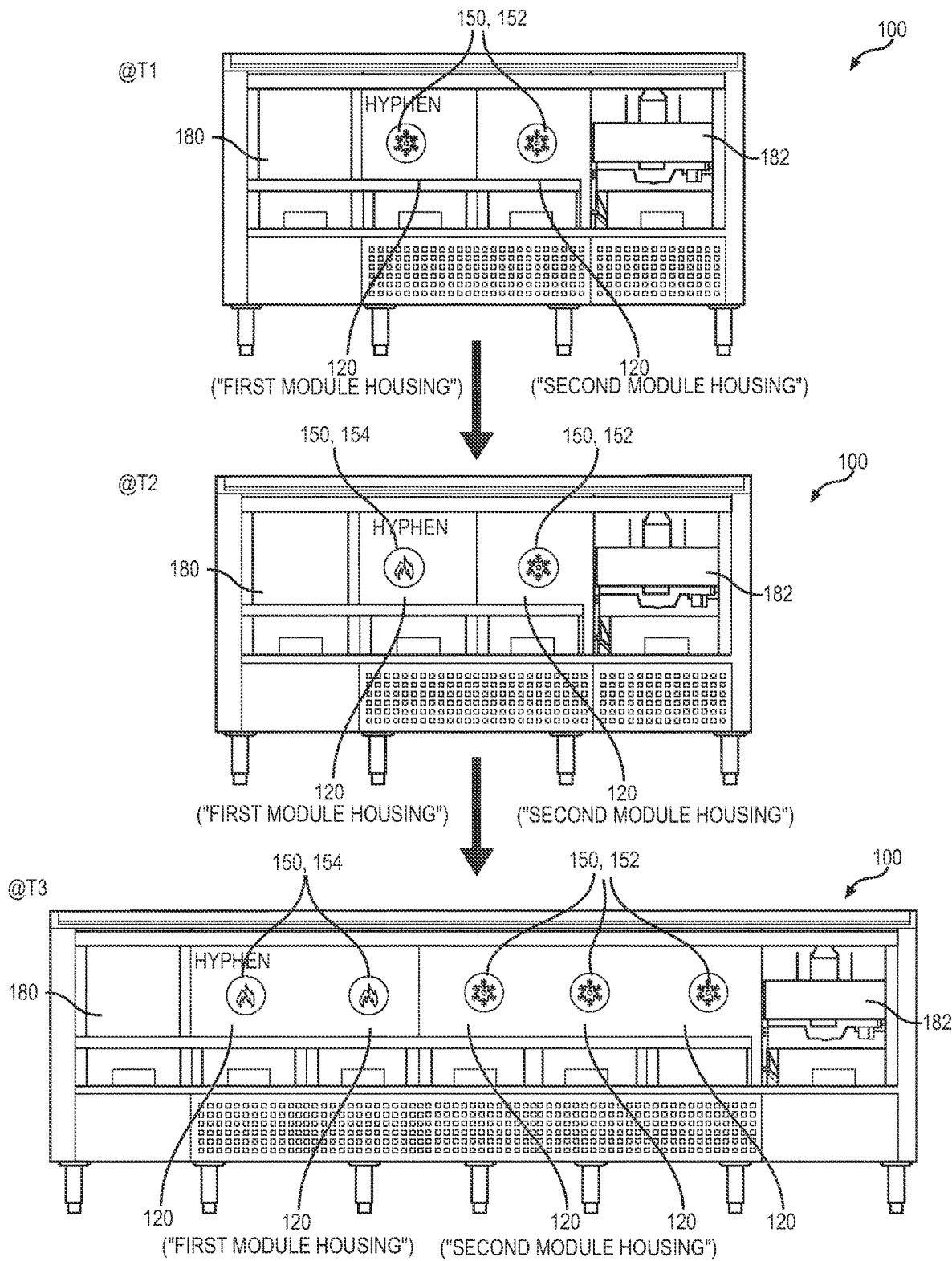
FIG. 4 is a schematic representation of one variation of the food production system.
Figure 5:
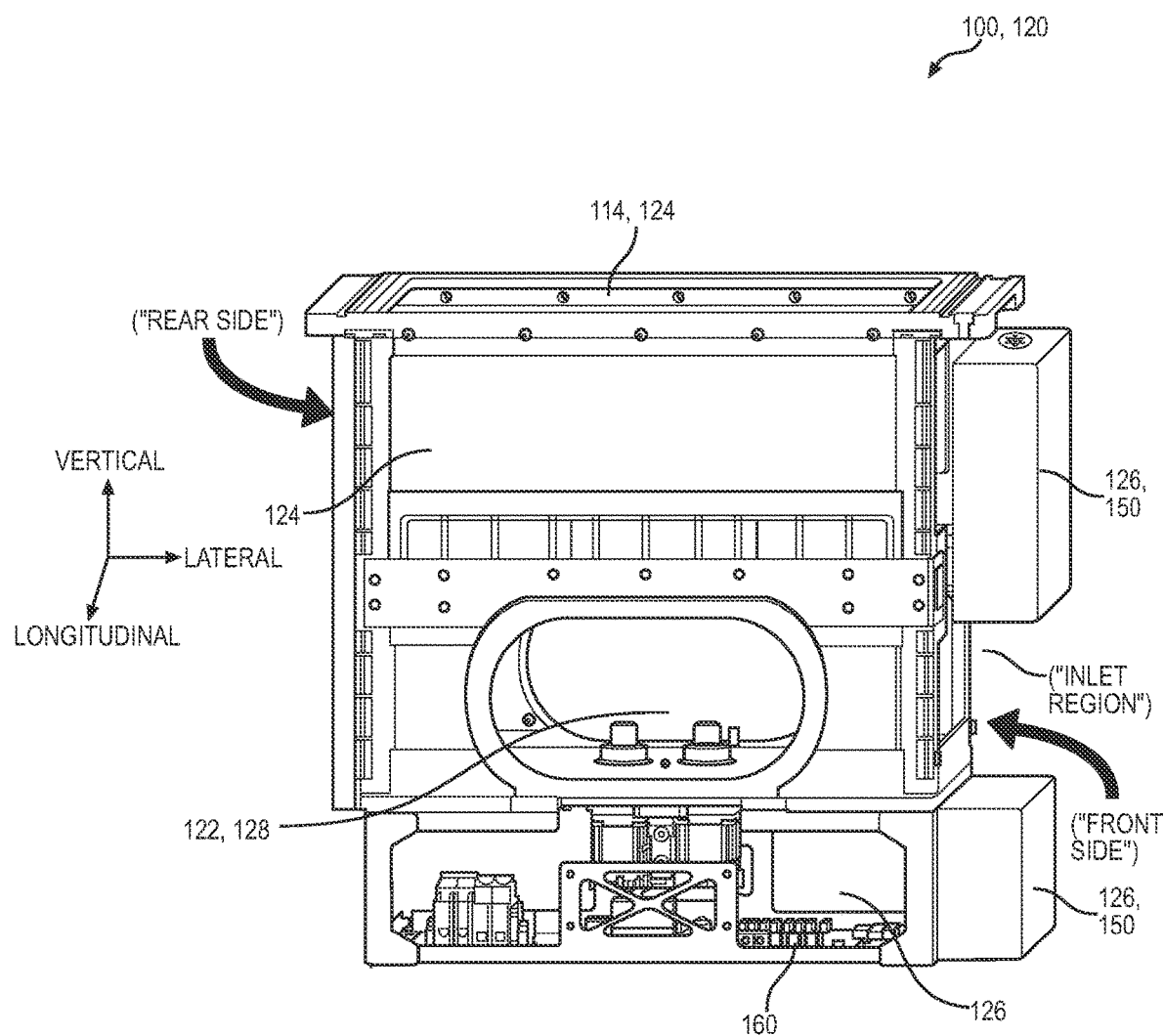
FIG. 5 is a schematic representation of one variation of the food production system.

The food production system 100 can include a manual assembly zone 110 including the food preparation surface 112 and a receptacle 114 configured to receive the sequence of food hoppers transiently located atop the food preparation surface 112 and configured to store ingredients for manual preparation of units of food products according to food orders submitted by patrons. As shown in FIGS. 2A and 2B, the manual assembly zone 110 can be configured such that an employee may stand facing a front side (or "food-handling side") of the food production system 100—proximal the sequence of food hoppers—to handle ingredients and/or assemble food orders while a patron views and/or manually points at ingredients along a back side of the food production system 100.

In one implementation, the receptacle 114 can be configured to receive the sequence of food hoppers arranged in subgroups along the manual assembly zone 110. In particular, in this implementation, the receptacle 114 can define a sequence of hopper slots, each hopper slot corresponding to a particular subregion of the receptacle 114. For example, the manual assembly zone 110 can include: a first group of food hoppers (e.g., 1, 3, 6 food hoppers) arranged in a first hopper slot within the receptacle 114; a second group of food hoppers arranged in a second hopper slot—adjacent the first hopper slot—within the receptacle 14; and a third group of food hoppers arranged in a third hopper slot—adjacent the second hopper slot opposite the first hopper slot—within the receptacle 114.

In this implementation, each hopper slot can be configured to define a fixed slot dimension configured to receive a single, full-size food hopper defining a fixed length and a fixed width corresponding to the fixed slot dimension. Therefore, each hopper slot can further be configured to receive: two, one-half-size food hoppers; three, one-third-size food hoppers; six, one-sixth-size food hoppers; two, one-sixth-size food hoppers and one, one-third-size food hopper; etc. Further, each hopper slot can be configured to define the fixed slot dimension, such that each hopper slot is aligned with (e.g., arranged over) a single module housing 120, in the sequence of module housings 120, of the food production system 100.

5. Food Production System Components: Autonomous Assembly

Generally, the food production system 100 can include: a sequence of module housings 120 supporting the food preparation surface 112 and defining an autonomous assembly zone 120 extending along a longitudinal assembly axis; and a sequence of modules configured to transiently install within the sequence of module housings 120 to support autonomous construction of food products within the autonomous assembly zone 122 according to food orders received from patrons.

In particular, the food production system 100 includes: a sequence of module housings 120 configured to house a set of food-handling modules (e.g., food-dispensing modules 130, food processing modules); a positioner module 140 configured to move a food container along a length of the autonomous assembly zone 122 as the food container is filled with ingredients; a set of infrastructure modules—such as including heating, cooling, electronic, and/or power modules—arranged within the sequence of module housings; and a controller 160 configured to receive food orders from patrons and selectively actuate the set of infrastructure modules and the set of food-handling modules (e.g., for dispensation of ingredients) in order to complete these food orders.

The food production system 100 can include a sequence of food hoppers configured to store ingredients corresponding to food orders. In one implementation, as described above, the sequence of food hoppers located along the manual assembly zone 110 are coupled to the set of food-handling modules of the autonomous assembly zone 122, such that the sequence of food hoppers can be configured to store ingredients for both the manual assembly zone 110 and the autonomous assembly zone 122.

5.1 Module Housings

The food production system 100 can include a sequence of module housings 120 configured to transiently locate a set of food-production modules—such as including food-dispensing and food-processing modules—within the autonomous assembly zone 122.

In one implementation, each module housing 120 is configured to exhibit a fixed unit dimension and configured to transiently receive a set of food-production modules—such as food-dispensing modules 130, food-processing modules, container-dispensing modules, infrastructure modules (e.g., heating or cooling modules 152), etc.—defining a standard footprint.

For example, the food production system 100 can include a sequence of module housings 120 including: a first module housing 120 configured to receive a container-dispensing module; a second module housing 120 configured to receive a first food-dispensing module 130 configured to dispense hot ingredients into a food container arranged below the first food-dispensing module 130; a third module housing 120 configured to receive a second food-dispensing module 130 configured to dispense cold ingredients into a food container arranged below the second food-dispensing module 130; a fourth module housing 120 configured to receive a third food-dispensing module 130 configured to dispense room-temperature ingredients into a food container arranged below the third food-dispensing module 130; a fifth module housing 120 configured to receive a refrigeration module; a sixth module housing 120 configured to receive a "finishing" module; and/or a seventh module housing 120 configured to receive an elevator module.

In one implementation, each module housing 120 can be configured to: exhibit a fixed unit dimension defining a fixed width, a fixed length, and a fixed height; and configured to receive food-production modules of standard footprint sizes in a set of module slots arranged within the module housing 120. Each module slot, in the set of module slots of the module housing 120, can therefore be configured to locate a particular food-production module (or "module")—such as a food-dispensing module 130, an infrastructure module, and/or a positioner module 140—within the module housing 120 of the fixed unit dimension. The module housing 120 can therefore include these module slots—each configured to transiently receive modules of a particular module type (e.g., food-dispensing, infrastructure, conveyor)—arranged in a particular configuration configured to: minimize the fixed unit dimension of the module housing 120, thereby reducing a total footprint of the food production system 100; enable rapid installation and/or removal of modules from the module housing 120, such as for cleaning and/or for reconfiguration of the module housing 120; and promote high-throughput production of food products according to food orders submitted by patrons.

For example, each module housing 120 can be configured to define: a fixed width (e.g., 14 inches, 16 inches, 18 inches) exceeding a standard width (e.g., approximately 12 inches) of a standard, full-size service pan (or "full-size hotel pan" or "full-size food pan"); and a fixed length (e.g., 32 inches, 36 inches, 40 inches) exceeding a standard length (e.g., approximately 20 inches) of the standard, full-size service pan, such that the module housing 120 can receive a set of a set of food hoppers (e.g., a single full-size food hopper, three one-third-size food hoppers, six one-sixth size food hoppers)—configured to collectively approximate the standard width and the standard length of a full-size service pan—within the receptacle 114 integrated into the food preparation surface 112 and extending into the module housing 120. In this example, the module housing 120 can further define a fixed height (e.g., 36 inches, 38 inches, 40 inches) falling within a target height range corresponding to an average work height, such that an employee may comfortably stand facing the front side of the food production system 100 while handling food on the food preparation surface 112.

Additionally, each module housing 120 can include a housing door (hereinafter a "door") arranged across a front side of the module housing 120 and configured to enable user accessing to an interior of the module housing 120, such as during installation, cleaning, and/or removal of modules transiently installed within the module housing 120.

5.2 Food Module Housings

The food production system 100 includes a sequence of food module housings 120 configured to transiently locate food-dispensing modules 130 within the food production system 100. In particular, individual food-dispensing modules 130 can be loaded into individual food module housings 120 to form an assemblage of food-dispensing modules 130 that cooperate to dispense a particular combination of ingredients into a food container in order to construct these ingredients into a food product of a particular type according to a food order (e.g., submitted by a patron). Further, each food module housing 120 can be configured to couple to another food module housing 120, in the sequence of food module housings 120, to form a continuous make line.

In particular, in one implementation, a food module housing 120 can include: a rear wall defining a rear side (or "customer-facing side") of the food module housing 120; a front wall—defining a front side (or "working-facing side") of the food module housing 120—opposite the rear wall and including a door configured to enable user access to an interior of the food module housing 120; an inlet wall—defining an inlet side (e.g., a left or right side) of the food module housing 120—including a container inlet; and an outlet wall—defining an outlet side (e.g., a left or right side) of the food module housing 120—opposite the inlet wall and including a container outlet. In this implementation, a first food module housing 120 can be configured to: rigidly couple to a second food module housing 120 at the inlet wall, such as via a first set of coupling features integrated into the inlet wall; and/or rigidly couple to a third food module housing 120 along the outlet wall, such as via a second set of coupling features integrated into the outlet wall.

For example, the food production system 100 can include: a first module housing 120 defining an outlet arranged on outlet wall of the first module housing 120; and a first set of coupling features integrated into the outlet wall; and a second module housing 120 defining an inlet arranged on an inlet wall of the second module housing 120 and including a second set of coupling features integrated into the inlet wall. In this example, the first set of coupling features of the first module housing 120 can be configured to couple to the second set of coupling features of the second module housing 120 to: align the outlet of the first module housing

120 with the inlet of the second module housing 120; and rigidly couple the second module housing 120 to the first module housing 120.

Additionally, in one implementation, each food module housing 120 can be configured to transiently receive and store ingredients of a particular ingredient type. For example, the food production system 10*o* can include: a first food module housing 120 configured to transiently receive and store "cold" ingredients (or "refrigerated ingredients"); a second food module housing 120 configured to transiently receive and store "hot" ingredients (or "heated ingredients"); and/or a third food module housing 120 configured to transiently receive and store "dry" ingredients (or "room-temperature ingredients"). In this implementation, each food module housing 120 can be configured to store ingredients of the particular ingredient type—such as within a particular temperature range—to meet requirements for food safety and maintain a threshold food quality.

Therefore, in the preceding implementation, each food module housing 120 can be configured to store ingredient storage volumes—in food-dispensing modules 130—loaded with ingredients designated for cooling, heating, and/or maintaining at room temperature. Thus in this implementation, each food module housing 120 designated for cooling and storing "cold" ingredients: can be configured to receive a first set of food-dispensing modules 130 loaded with ingredients designated for cooling (or freezing); can thermally isolate these food-dispensing modules 130, such as from other sets of food-dispensing modules 130 containing room-temperature or heated ingredients; and can be coupled to a remote refrigeration module (e.g., a condenser unit and evaporator unit) to cycle through chilled refrigeration and thus cool ingredients in the first set of food-dispensing modules 130. Similarly, each food module housing 120 designated for heating and storing "hot" ingredients: can be configured to receive a second set of food-dispensing modules 130 loaded with ingredients designated for heating; can thermally isolate these food-dispensing modules 130, such as from other sets of food-dispensing modules 130 containing cold-temperature or heated ingredients; and can be configured to house a heater module to heat ingredients in the second set of food-dispensing modules 130. In particular, in this implementation, a first set of food-dispensing modules 130 containing ingredients designated to be cooled (or "cold ingredients") can be grouped together and located within one (or a small number of) food module housings 120 and cooled via the global refrigeration module (e.g., remote from the food module housing); a second set of food-dispensing modules 130 containing ingredients designated for room-temperature storage (or "room-temperature ingredients") can be similarly grouped (and located in a thermally-insulated room-temperature housing); and a third set of food-dispensing modules 130 containing ingredients designated for higher-temperature storage (or "hot ingredients") can be similarly grouped (and located in a thermally-insulated heated housing, which can be similarly coupled to a remote heating module 154).

Therefore, in order to maintain ingredients within a particular temperature range matched to an ingredient type (e.g., cold, hot, room-temperature ingredients), each food module housing 120 can be thermally insulated from adjacent food module housings 120. For example, walls of each food module housing 120 can include thermal insulation (e.g., an insulator lining) configured to limit temperature variations within the food module housing 120 and/or within adjacent food module housings 120. In another example, each food module housing 120 can include a layer of thermal insulation arranged along a single side of the food module housing 120 configured to couple to another food module housing 120, such as on the inlet side or the outlet side. Therefore, when aligned to form the food production system 100, each food module housing 120 includes a layer of thermal insulation arranged between an interior of the food module housing 120 and an interior of each adjacent food module housing 120.

Generally, the food production system 100 can include a quantity of food module housings 120—and arranged in a particular order—corresponding to a quantity and/or type of ingredients required to assemble food orders at a particular dining establishment. The food production system 100 can therefore be configured to include a custom quantity of food module housings 120 tailored to types of ingredients and/or food orders offered at the particular dining establishment containing the food production system 100. For example, a first instance of the food production system 100—configured to construct smoothies—can include a first sequence of food module housings 120 including: a first food module housing 120 configured to store a first set of cold ingredients (e.g., fruit, milk, yogurt); and a second food module housing 120—coupled to the first-food module housing 120—configured to store a first set of dry ingredients (e.g., granola, protein powder, peanut butter, nuts). In another example, a second instance of the food production system 100—configured to construct salads—can include a second sequence of food module housings 120 including: a first food module housing 120 configured to store a first set of cold ingredients (e.g., lettuce, spinach, kale); a second food module housing 120 configured to store a first set of hot ingredients (e.g., warm vegetables, rice); and a third food module housing 120 configured to store a second set of cold ingredients (e.g., toppings, cheeses, cold vegetables).

5.2.1 Dispenser Slot

As shown in FIGS. 5B and 6, each food module housing 120 can include a dispenser slot 124 configured to transiently locate a food-dispensing module 130 within the food module housing 120.

In one implementation, the food module housing 120 includes a dispenser slot 124 of a fixed unit dimension and configured to transiently receive food-dispensing modules 130—each food-dispensing module 130 defining a standard footprint—such that the food module housing 120 can be configured to receive different food-dispensing modules 130 over time within the dispenser slot 124.

Additionally, in another implementation, the food module housing 120 can include a dispenser slot 124 arranged adjacent the receptacle 114 of the manual assembly zone 110, such that one or more food hoppers—seated within the receptacle 114—extend below into the dispenser slot 124 to couple to a food-dispensing module 130 loaded in the dispenser slot 124. The dispenser slot 124 can therefore be configured to receive a food-dispensing module 130 and a set of food hoppers transiently coupled to the food-dispensing module 130.

Further, in this implementation, the food module housing 120 can include the dispenser slot 124 arranged along a rear side (e.g., the customer-facing side) of the food module housing 120, such that the dispenser slot 124 is located directly below the receptacle 114 and the food preparation surface 112 is arranged over a front side of the food module housing 120.

5.2.2 Positioner Slot

Each food module housing 120 can also include a positioner slot 128 configured to transiently locate a positioner module 140 below the set of food-dispensing modules 130—within the autonomous assembly zone 122—within the food module housing 120.

In particular, the food module housing 120 can include a positioner slot 128 arranged below the dispenser slot 124 and configured to locate a unit of the positioner module 140 in a target position relative the dispenser slot 124 and/or a food-dispensing module 130 loaded in the dispenser slot 124. The positioner slot 128 can include a set of retention features configured to engage a corresponding set of engagement features—arranged on each unit of the positioner module 140—to secure the unit of the positioner module 140 within the food module housing 120 and in a target orientation and position relative the food-dispensing module 130. Further, the positioner slot 128 can extend between the inlet and the outlet of the food module housing 120, such that the positioner module 140 can: receive a food container at an inlet of the food module housing 120; and output the food container—such as to a second positioner module 140 loaded within an adjacent food module housing 120—at the outlet of the food module housing 120.

In one implementation, the food module housing 120 can include a positioner slot 128 configured to receive a positioner module 140 at a particular height within the food module housing 120, such that the positioner module 140 can locate a food container within a threshold height and/or distance from the food-dispensing module 130 arranged vertically above the positioner module 140. Further, the positioner slot 128 can be configured to locate the positioner module 140 at this particular height within the food module housing 120, such that the positioner module 140 seats above a bottom surface of the food module housing 120 by at least a threshold height, such that any food dispensed that misses the container may fall below the positioner module 140 and onto the bottom surface of the module housing 120 and/or a tray arranged beneath the positioner module 140, without interfering with actuation of the positioner module 140.

5.2.3 Infrastructure Slots

Each food module housing 120 can also include a set of infrastructure slots 126 configured to transiently locate a set of infrastructure modules—such as a heater unit, an evaporator unit, and/or a compressor unit—within the food module housing 120.

In one implementation, the food module housing 120 can define a first infrastructure slot 126 configured to house a temperature-regulating module 150 (e.g., an evaporator unit or a heater unit) of fixed unit dimension (e.g., fixed width, height, and depth) and arranged along the front side—opposite the dispenser slot 124 arranged along the rear side—of the food module housing 120. For example, the food module housing 120 can include a first infrastructure slot 126 arranged along the front side—below the food preparation surface 112—and configured to receive a temperature-regulating module 150 (e.g., a refrigeration module, a heating module 154) of fixed unit dimension corresponding to an ingredient type assigned to the food module housing 120. In this example, the infrastructure slot 126 can define: a slot width approximating and/or less than the standard width of the food module housing 120; a slot length (e.g., 8 inches) approximating a length of the food preparation surface 112, such that food preparation surface 112 seats above the infrastructure slot 126, without requiring extension of the food preparation surface 112 outward from the food module housing 120.

Additionally, in another implementation, each food module housing 120, in the assembled food production system 100, can include a second infrastructure slot 126 (or "electronics slot" configured to house additional infrastructure components—such as a local controller 160, an electrical power supply, an AC distribution unit, and/or a data bus extending between infrastructure and dispenser slots 124 in adjacent food module housings 120 and/or other module housings 120 in the food production system 100—and configured to: distribute electrical power from a power module installed in a power slot; distribute pressurized air from a compressor module installed in a compressor slot; and/or distribute control signals and sensor signals between these food-dispensing and infrastructure modules. For example, the food module housing 120 can include a second infrastructure slot 126 arranged in a lower region of the food module housing 120—such as adjacent a bottom surface of the food module housing 120—below the dispenser slot 124 and/or first infrastructure slot 126.

5.2.4 Window

In one implementation, each food module housing 120 includes a window 129—arranged on a front surface of the module housing 120—configured to enable user access to an interior of the module food module housing 120. For example, the window 129 can define an opening arranged on the front surface of the module housing 120. Alternatively, in another example, the window 129 can define a panel (e.g., a transparent or opaque panel)—configured to oscillate between an open and closed position—arranged on the front surface of the module housing 120.

In particular, in this implementation, a food module housing 120 can include a window 129: arranged on a front surface—such as facing an operator of the food production system 100—of the module housing 120; and arranged proximal the autonomous assembly zone 122 of the food module housing 120.

For example, the food module housing 120 can include a window 129: arranged on the front side of the food module housing 120; and arranged coaxial an inlet region intersecting the autonomous assembly zone 122, such that the inlet region extends between the window 129 and the autonomous assembly zone 122. An operator may therefore reach through the window 129 and inlet region to access the autonomous assembly zone 122, such as to clean surfaces within the autonomous assembly zone 122 and/or replace components (e.g., the positioner module 140, a drip tray 142) arranged within the autonomous assembly zone 122.

In particular, in one example, a food module housing 120—configured to store and dispense units of "cold" ingredients (or "refrigerated" ingredients)—can: define a dispenser slot 124 arranged along a rear side of the food module housing 120 and configured to transiently house one or more food-dispensing modules 13o; define an autonomous assembly zone 122 arranged below the dispenser slot 124 and extending along a longitudinal assembly axis; and include a window 129 arranged on a front side of the food module housing 120 and configured to enable user access (e.g., operator access) to the autonomous assembly zone 122. The food module housing 120 further defines an infrastructure slot 126 arranged along a front side of the food module housing 120, configured to transiently house a refrigeration module—including a compressor unit and an evaporator unit—and defining: an upper slot configured to transiently house the evaporator unit; a lower slot configured to transiently house the compressor unit; and an inlet region— extending between the window 129 and the autonomous assembly zone 122—interposed between the upper slot and the lower slot. The food module housing 120 can therefore be configured to locate the evaporator unit at a fixed height from the compressor unit in order to define an inlet region—approximately vertically (e.g., longitudinally) aligned with the autonomous assembly zone 122—of the fixed height, and thereby enable user access into the autonomous assembly zone 122 via the window 129 and the inlet region.

In one example, the window 129 can define an opening arranged on the front surface of the module housing 120 and be configured to receive a drip 142 configured to install within the autonomous assembly zone 122 below the positioner module 140. In this example, the window 129 can define a window height approximating and/or exceeding a tray height of the drip tray 142 by a target difference, such that walls of the drip tray 142—of the tray height—substantially span the opening when installed within the autonomous assembly zone 122, thereby preventing spills and/or food debris outward through the window 129 during actuation of the set of food-dispensing modules 130 and/or the positioner module 140.

Alternatively, in another example, the window 129—such as defining a hinged or sliding window—can be configured to: occupy a closed position during actuation of modules of the food module housing 120 for assembly of food orders; and occupy an open position—responsive to manual opening of the window 129 by an operator—to enable operator access to the autonomous assembly zone 122, such as for cleaning of surfaces within and/or below the autonomous assembly zone 122 and/or for replacement and/or installation of components (e.g., a positioner module 140, a drip tray 142) within the autonomous assembly zone 122.

5.3 Container Module Housing

In one implementation, the food production system 100 can include a container module housing 180 configured to transiently locate a set of container-dispensing modules—configured to selectively dispense containers onto a platform of a positioner module 140 (e.g., a kinematic positioner, a conveyor belt) based on food orders—within the food production system 100. For example, the food production system 100 can include a container-module housing 120 configured to receive a container-dispensing module—such as configured to selectively dispense containers of a particular shape or size—and arranged as a first module housing 120 in the sequence of module housings 120.

In one implementation, the container module housing 180 can define a container outlet—arranged on a first side of the container module housing 180 configured to couple to a subsequent module housing 120 (e.g., a food module housing) in the sequence of module housings 120—configured to enable transfer of containers from the container module housing 180 into subsequent module housings 120 for assembling food orders.

5.4 Variation: Refrigeration Module Housing

Figure 8A:
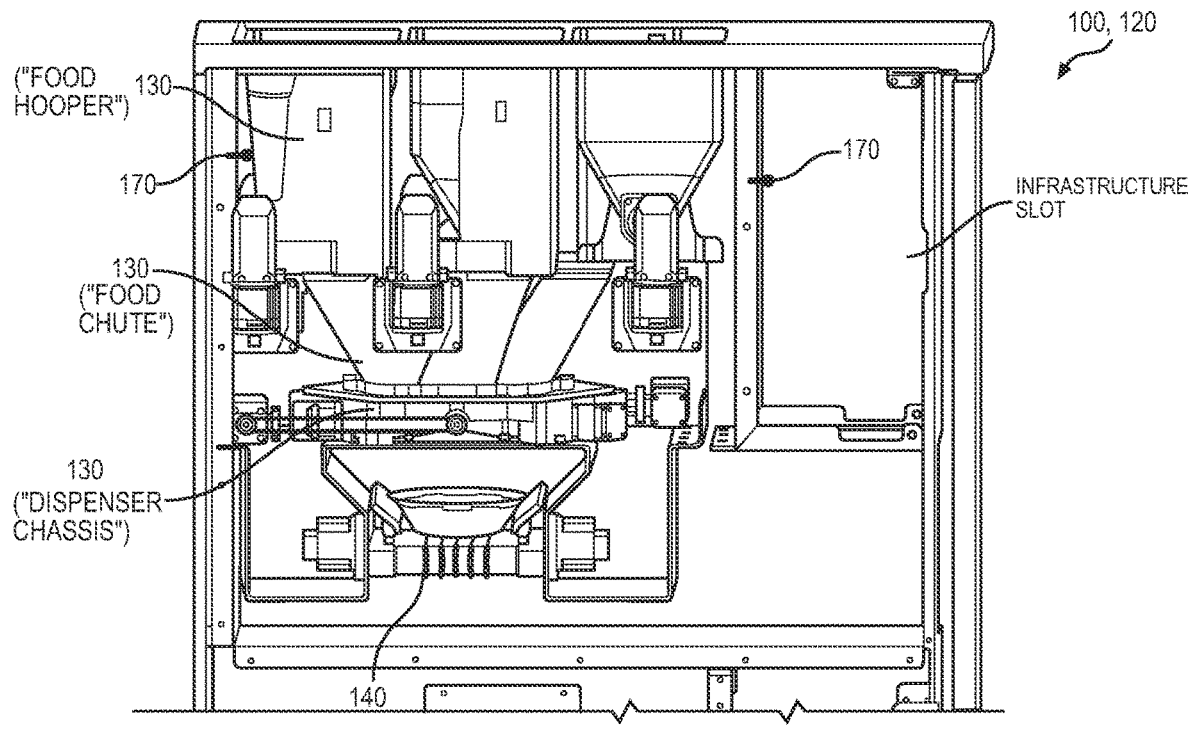
FIGS. 8A and 8B are schematic representations of one variation of the food production system.
Figure 8B:
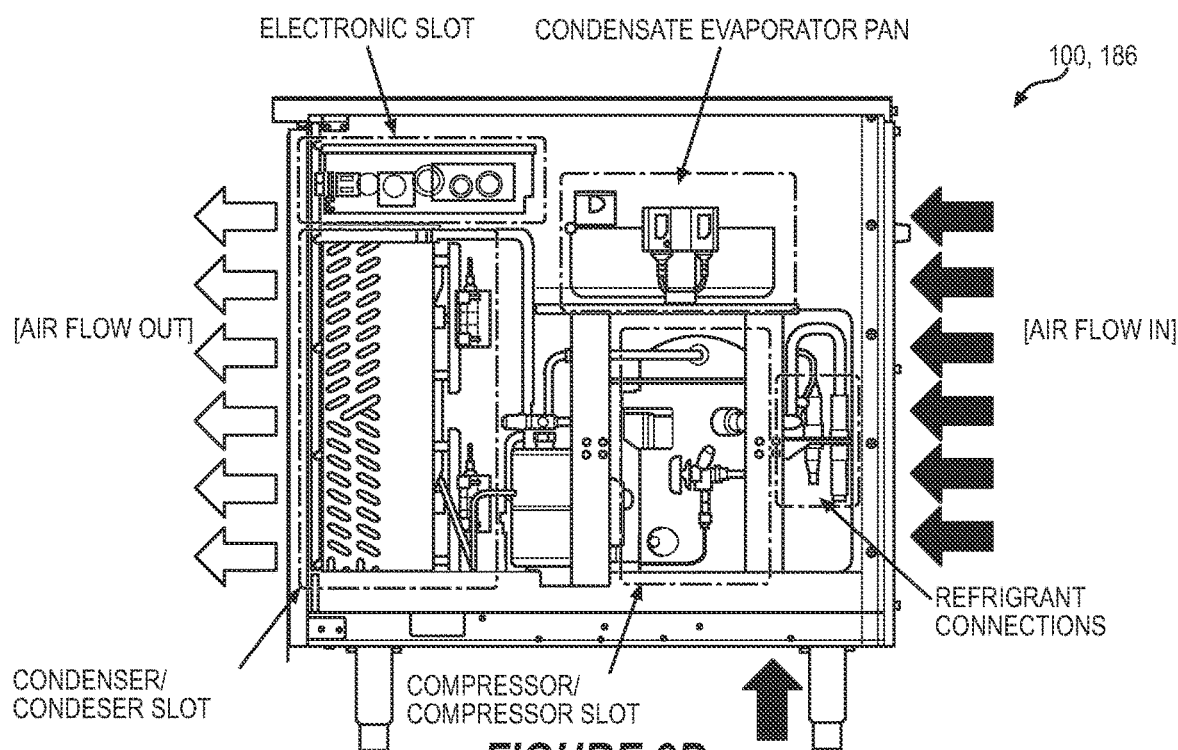
Figure 9A:
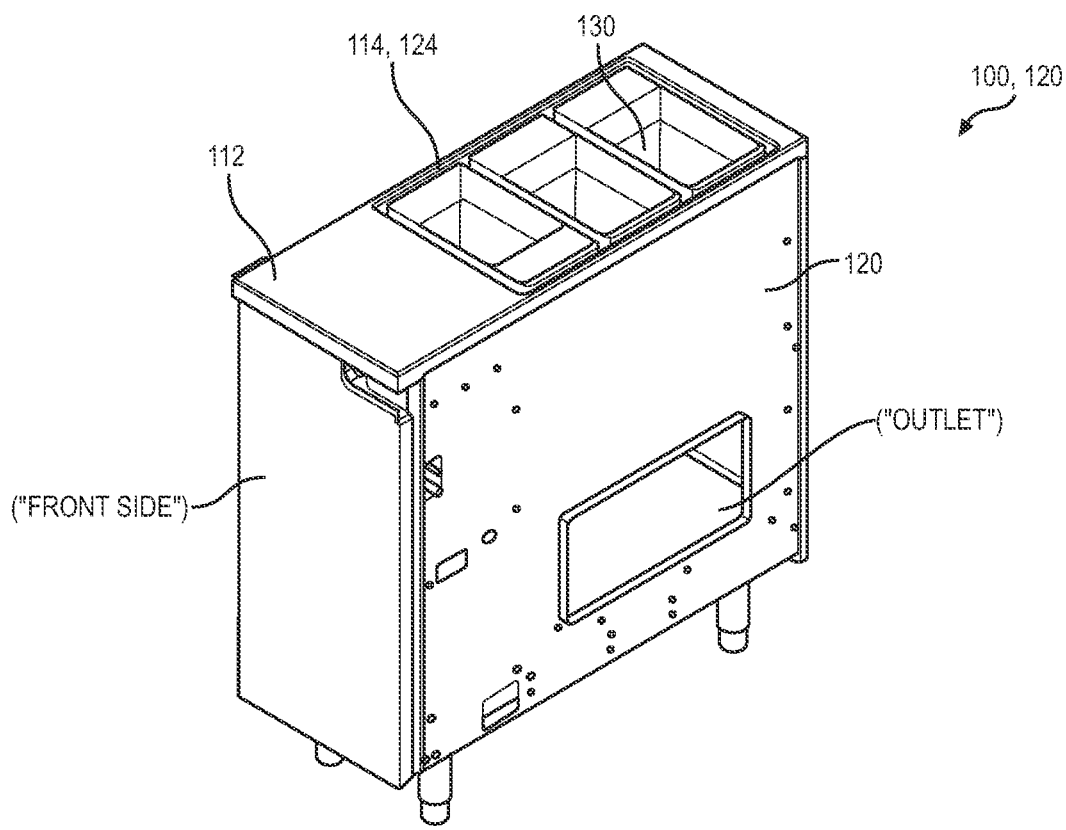
FIGS. 9A and 9B are schematic representations of one variation of the food production system.
Figure 9B:
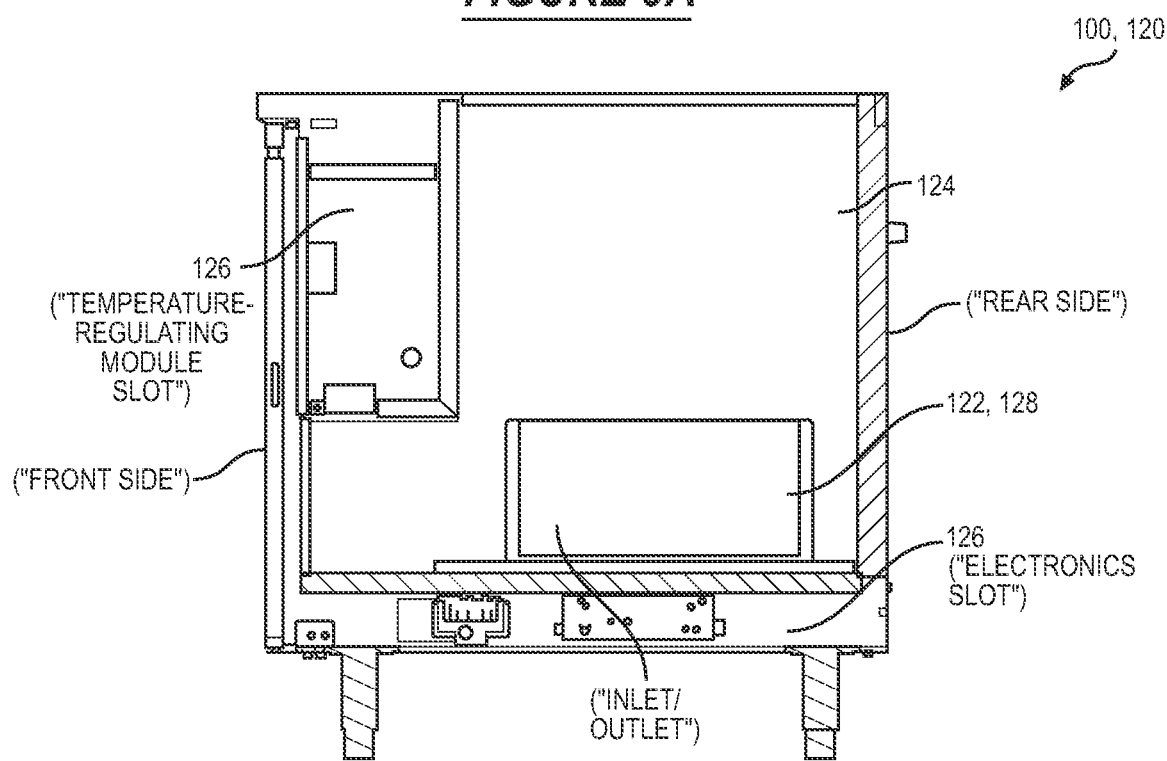
Figure 10:
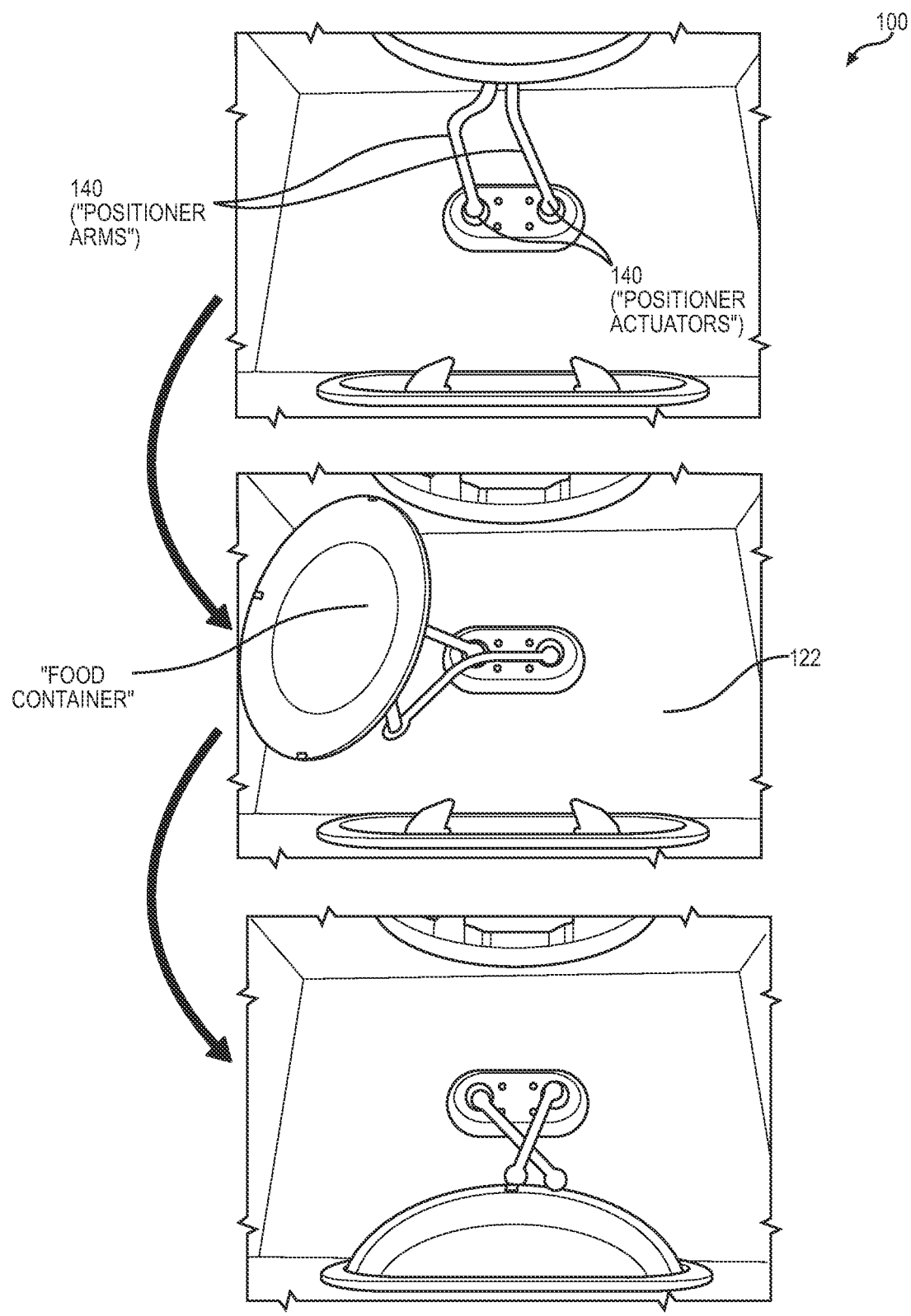
FIG. 10 is a schematic representation of one variation of the food production system.

In one variation, as shown in FIG. 8B, the food production system 100 can include a refrigeration module housing 186 configured to transiently locate a set of refrigeration modules—configured to support refrigeration-type functions—within the food production system 100. For example, the food production system 100 can include a refrigeration-module housing 120 configured to receive a set of refrigeration modules, such as a condenser unit and/or a condensate evaporator unit, configured to enable cooling of ingredients contained in food module housings 120 in the food production system 100.

In one implementation, the food production system 100 can include a refrigeration-module housing 120—configured to transiently receive a set of refrigeration modules—arranged on an end of the food production system 100, such that the refrigeration module housing 120 is a final module housing 120 in the sequence of module housings 120. For example, the refrigeration-module housing 120 can define a first module housing 120, in the sequence of module housings 120, such that the refrigeration module is coupled to the container module housing 180 at a start of the food production system 100 (e.g., preceding the sequence of food module housings 120). In another example, the refrigeration module can define a final module housing 120, in the sequence of module housings 120, such that the refrigeration module is coupled to the elevator housing at end of the food production system 100 (e.g., succeeding the sequence of food module housings 120).

Alternatively, in another implementation, the refrigeration module housing 120 can be located remotely from the food production system 100. For example, a dining establishment—including the food production system 100 installed in a first location within the dining establishment—can include the refrigeration module housing 120 installed in a second location within the dining establishment, such as on a roof of the dining establishment or in a kitchen proximal the first location.

6. Modules

Generally, the food production system 100 includes a set of modules—each configured to transiently install in a module housing 120 of the food production system 100—configured to cooperate to enable autonomous preparation of food products according to food orders submitted by patrons.

For example, the food production system 100 can include: a set of positioner modules 140 configured to transiently install in positioner slots 128 in food module housings 120; a set of food-dispensing modules 130 configured to transiently install in dispenser slots 124 in food module housings 120; a set of local infrastructure modules (e.g., an evaporator unit, a heater unit) configured to transiently install in infrastructure slots 126 in food module housings 120 to enable heating and cooling of ingredients loaded in these food module housings 120 and/or to supply power and data to these food module housings 120; a set of global infrastructure modules (e.g., a condenser unit, a condensate-evaporator unit) configured to transiently or permanently install in infrastructure slots 126 in an infrastructure-module housing 120; and/or a set of container-dispensing modules configured to transiently install in a container-dispensing slot in a container-module housing 120. These modules can thus be installed (e.g., within corresponding slots of the food production system 100), removed, replaced, and/or reinstalled within the food production system 100 over time to enable: production of food products according to food orders; cleaning of modules and/or interior walls or slots of module housings 120 in the sequence of module housings 120; and/or reconfiguration of the food production system 100 over time, such as to accommodate different ingredients and/or a different ingredient arrangement.

6.1 Food-Dispensing Modules

The food production system 100 also includes a sequence of food-dispensing modules 130, each food-dispensing module 130 (e.g., automatic dispenser) configured to transiently install within a food module housing 120 and configured to dispense an amount (e.g., a volume, a mass, a number of units) of an ingredient toward the autonomous assembly zone 122 (e.g., into a food container within the positioner module 140). Generally, the food production system 100 includes a population of food-dispensing modules 130 configured to: transiently install within a particular food module housing 120 to dispense ingredients responsive to control inputs received from controllers 160 in the autonomous assembly zone 122; and to then be removed from the food module housing 120 for cleaning, replacement with other food-dispensing modules 130, and/or reloading with ingredients before re-deployment. For example, a worker may rapidly and easily remove (e.g., without any tools) a food-dispensing module 130 from the food production system 100 for cleaning, reload the food-dispensing module 130 with a particular ingredient, and replace the food-dispensing module 130 within the food production system 100.

In one implementation, the sequence of food-dispensing modules 130 can include: frozen-food-dispensing modules 130 configured to dispense metered volumes or mass units of ice, frozen fruits, and frozen vegetables; refrigerated-food-dispensing modules 130 configured to dispense metered volumes or mass units of fresh ingredients (e.g., fruits, vegetables, meats, dairy products); warm-food-dispensing modules 130 configured to dispense metered volumes or mass units of warm prepared ingredients (e.g., vegetables, meats, rice, noodles); and dry-food-dispensing modules 130 configured to dispense metered volumes or mass unites of ambient-temperature ingredients (e.g., granola, nuts, seeds, dried fruit).

In another implementation, the food-dispensing modules 130 can include liquid dispensing modules configured to dispense metered volumes of liquid, such as juice, water, and low-viscosity (or "thin") sauces. In a similar implementation, the food production system 100 includes food paste dispensing modules configured to dispense metered volumes of gels and higher-viscosity liquids, such as butters, yogurt, and thick sauces (e.g., dressings). For example, the food production system 100 can include liquid dispensing modules including: a liquid container loaded with a volume of the liquid; and an automatic dispenser, coupled to the liquid container, and configured to dispense metered amounts of the liquid into food containers below for assembling food orders including this liquid. In this example, the liquid dispensing module can be configured to: dispense a metered amount of the liquid directly into a food container loaded with other ingredients for assembling a particular food order; and/or dispense a metered amount of the liquid into a secondary food container (e.g., within the food container or presented "on the side") served with the food container to a patron associated with the particular food order.

In yet another implementation, the food production system 100 includes slicing-type dispensing modules configured: to be loaded with whole (or nearly-whole) units of ingredients, such as lettuce, onion, tomato, kiwi, or apple; to slice stored ingredients when triggered by controller 160; and to dispense ingredient slices.

In yet another implementation, the food production system 100 includes powder food-dispensing modules 130 configured to dispense metered volumes or mass units of powdered goods, such as salt, sugar, spices, or seeds.

The food production system 100 can include any combination of these types of food-dispensing modules 130. In one implementation, the food production system 100 includes multiple sets of food-dispensing modules 130. For example, a first instance of the food production system 100 can be configured for assembling smoothies. In this example, the food production system 100 can include: a first set of food-dispensing modules 130 configured to dispense metered volumes of different flavored yogurts; a second set of food-dispensing modules 130 configured to dispense metered volumes of frozen fruits; and a third set of food-dispensing modules 130 configured to dispense different liquid bases (e.g., coffee, orange juice, milk). In this example, in response to receiving a food order for a particular smoothie, the system can dispense: a first volume of vanilla yogurt from a first food-dispensing module 130 in the first set of food-dispensing modules 130; a second volume of frozen pineapple from a second food-dispensing module 130 in the second set of food-dispensing modules 130; and a third volume of orange juice from a third food-dispensing module 130 in the third set of food-dispensing modules 130.

However, the food production system 100 can include food-dispensing modules 130 configured to dispense or meter ingredients of any other type or format.

6.1.1 Hoppers+Food-Dispensing Modules

In one implementation, the sequence of food hoppers of the manual assembly zone 110 and the food-dispensing modules 130 of the autonomous assembly zone 122 are physically coextensive, such that the sequence of food hoppers supply ingredients to both the manual assembly zone 110 and the autonomous assembly zone 122.

For example, the food production system 100 can include a food hopper, transiently loaded in the receptacle 114 of the manual assembly zone 110, extending downward from the food preparation surface 112 into a dispenser slot 124 of a food module housing 120 arranged below the food preparation surface 112, and coupled to an automatic dispenser arranged in the dispenser slot 124. When filled with an ingredient, the food hopper can thus feed the automatic dispenser to automatically complete food orders via the autonomous assembly zone 122. Additionally, a worker may reach into the food hopper (e.g., from an opening approximately flush the food preparation surface 112) to access the ingredient for completion of food orders via the manual assembly zone 110.

In one example, the food production system 100 can include a sequence of module housings 120 supporting the food preparation surface 112—located at a work surface height—defining a receptacle 114 configured to receive a set of food hoppers. Each food module housing 120, in the sequence of food module housings 120, can include a dispenser slot 124 arranged below the receptacle 114 and configured to transiently receive: a food-dispensing module 130 configured to transiently seat in a lower region of the dispenser slot 124; and a first set (or "cluster") of food hoppers (e.g., one, three, five, or six food hoppers), in the sequence of food hoppers, arranged within a first section of the receptacle 114—coextensive an upper region of the dispenser slot 124—and configured to transiently couple to the food-dispensing module 130 to supply ingredients loaded in the first set of food hoppers to the food-dispensing module 130.

6.1.2 Food-dispensing Module: Food Container+Dispenser Assembly

In one implementation, the module housing 120 includes a base platform: interposed between the autonomous assembly zone 122 and the dispenser slot 124; configured to support the set of food-dispensing modules 130; and including a set of actuators arranged in a fixed configuration and configured to transiently couple to corresponding features of the food-dispensing module 130 to drive dispensation of ingredients. The food-dispensing module 130 includes: an ingredient container (e.g., a food pan, a "food hopper") configured to transiently store and release ingredients via a food outlet; and a dispenser assembly—coupled to the ingredient container—configured to release ingredients from the ingredient container via the food outlet. The dispenser assembly can include: a base section coupled to a bottom of the ingredient container; one or more drivetrains integrated into the base section and defining a set of mount sections (e.g., internal splines) configured to mechanically couple to one or more actuators on the base platform; and a set of food agitators (e.g., one, two, four, six) configured to transiently install within an interior volume of the ingredient container and couple to the drivetrain to drive ingredients toward the food outlet for dispensation responsive to actuation (e.g., in a particular direction) of the drivetrain via the set of actuators installed on the base platform.

Furthermore, the food production system 100 can include food-dispensing modules 130 of a set of dispenser types configured to store and dispense ingredients of varying types (e.g., solid, liquid, high or low viscosity, moisture level) and/or varying amounts. For example, each dispenser type, in the set of dispenser types, can define: a particular geometry and/or footprint configured to nest within the dispenser receptacle 114 between the food preparation surface 112 and the base platform; a food outlet of a particular outlet type and/or arranged in a particular location matched to a particular ingredient type(s) and/or a target plating pattern (e.g., layered, radial, oval, round, and/or rectangular plating); and/or a particular type(s) of food agitator compatible with the dispenser type and/or ingredient type, such as defining a particular size and/or geometry. Therefore, in order to enable dispensation of ingredients from each food-dispensing module 130, in the set of food-dispensing modules 130, each food-dispensing module 130 of each dispenser type can be configured to include one or more mount sections arranged in a particular location (e.g., within the dispenser assembly), such that the mount section aligns with a driveshaft of a corresponding actuator arranged on the base platform. An operator may therefore install, remove, and/or replace food-dispensing modules 130 of various dispenser types within the dispenser receptacle 114 over time in order to accommodate dispensation of different ingredients and/or a different arrangement of ingredients, regardless of variation between dispenser types.

6.1.3 Variation: Food-Dispensing Module Configuration

In one variation, as shown in FIG. 8A, each food module housing 120 can be configured to transiently locate a food-dispensing module 130—configured to couple to a particular group of food hoppers, in a sequence of food hoppers, arranged within the receptacle 114—within a dispenser slot 124 of the food module housing 120 to selectively dispense ingredients contained in food hoppers, in the group of food hoppers, into a food container arranged below the food-dispensing module 130.

In particular, in this variation, a first food module housing 120 can include a dispenser slot 124: coextensive a first subregion of the receptacle 114 configured to receive a first group of food hoppers; and configured to transiently receive a food-dispensing module 130. In this implementation, each food-dispensing module 130 can include a dispenser chassis defining: an upper face configured to face the food preparation surface 112 arranged above the food-dispensing module 130; a lower face configured to face the positioner module 140 arranged below the food-dispensing module 130; and including a set of dispenser outlets extending from the upper face and outward from the lower face.

The food-dispensing module 130 can further include a set of dispenser chutes mounted to the set of dispenser outlets and extending upward from the upper face of the dispenser chassis, each dispenser chute configured to transiently couple to a food hopper, in the group of food hoppers, seated within the dispenser slot 124. Therefore, the food-dispensing module 130 can include a quantity of dispenser chutes corresponding to (e.g., equivalent to) a quantity of food hoppers in the group of food hoppers seated with the dispenser slot 124 of the food module housing 120.

The dispenser chassis can further include a set of mounting features—integrated into and/or arranged about each outlet, in the set of outlets—configured to transiently engage corresponding features of a dispenser chute to rigidly couple the dispenser chute to the dispenser outlet at the upper face.

Further, in this variation, the food-dispensing module 130 can include a set of dispenser doors, each dispenser door: pivotably coupled to the lower face of the dispenser chassis proximal a corresponding dispenser outlet in the set of dispenser outlets; configured to transition between a closed position—in which the dispenser door covers the dispenser outlet thereby preventing ingredients from falling outward from the dispenser chute—and an open position in order to transiently release ingredients from the dispenser chute, via the dispenser outlet, and into a food container arranged below the dispenser outlet; and defining a curved surface configured to funnel ingredients—released from the dispenser outlet—into the food container when the dispenser door occupies the open position. Further, the food-dispensing module 130 can include a set of motors—such as a set of stepper and/or servo motors—coupled to the dispenser chassis and configured to drive the set of dispenser doors between the open and closed positions to dispense ingredients into the food container.

For example, the food module housing 120 can include a food-dispensing module 130—including a set of 6 dispenser chutes mounted to the dispenser chassis—arranged within a lower region of a dispenser slot 124 of the food module housing 120. In this example, each dispenser chute, in the set of 6 dispenser chutes, can be coupled to an outlet of a food hopper, in a group of 6 food hoppers, seated within an upper region of the dispenser slot 124—coextensive the receptacle 114 of the manual assembly zone 110—each food hopper loaded with amounts of a particular ingredient in a set of ingredients. Based on a food order—specifying inclusion of a first and second ingredient in the set of ingredients—the set of motors can drive a first dispenser door—coupled to a first dispenser outlet extending from a first dispenser chute, in the set of 6 dispenser chutes, coupled to a first food hopper, in the group of 6 food hoppers, containing the first ingredient—from the closed position to the open position to release a target amount of the first ingredient from the first dispenser outlet and into a food container arranged on a container-receiving surface (e.g., platform, conveyor belt) of the positioner module 140 below the food-dispensing module 130. Further, concurrently and/or after dispensing the first ingredient, the set of motors can drive a second dispenser door—coupled to a second dispenser outlet extending from a second dispenser chute, in the set of 6 dispenser chutes, coupled to a second food hopper, in the group of 6 food hoppers, containing the second ingredient—from the closed position to the open position to release a target amount of the second ingredient from the second dispenser outlet and into the food container.

Further, in this variation, each food-dispensing module 130 can be configurable based on a type and/or quantity of ingredients assigned to the food-dispensing module 130 and/or a target plating pattern—such as a radial pattern and/or layered pattern—assigned to food orders assembled by the food production system 100. For example, the food-dispensing module 130 can be configured to include a set of 3 dispenser chutes for installation in a food module housing 120 designated to receive a group of 3 food hoppers. In another example, the food-dispensing module 130 can be configured to include a set of 5 dispenser chutes for installation in a food module housing 120 designated to receive a group of 5 food hoppers. Further, each dispenser chute and corresponding dispenser outlet can be configured to exhibit a particular size based on a target plating pattern, such as a radial or layered plating pattern.

6.2 Infrastructure Modules

The food production system 100 can include a set of infrastructure modules configured to transiently install within module housings 120 of the food production system 100 and to support infrastructure-type functions at the food production system 100, such as power supply, refrigeration, communications, and/or regulated air pressure supply. These infrastructure modules can be configured to transiently install locally at each module housing 120—such as within each food module housing 120—and/or within a separate module housing 120 designated for receiving and storing infrastructure modules, such as within the refrigeration-module housing 120, as described above.

6.2.1 Food Module Housings: (Local) Heating & Cooling Modules

The food production system 100 can include a set of local heating modules 154 and/or cooling modules 152 configured to transiently install in food module housings 120 in order to regulate temperature of ingredients loaded and/or designated for loading in these food module housings 120.

In particular, in one implementation, the food production system 100 can include: a set of cooling modules 152—such as including an evaporator unit, a blower, and/or a (local) compressor unit—configured to transiently install in infrastructure slots 126 of food module housings 120 loaded with and/or designated to receive "cold" ingredients (e.g., ingredients designated for cooling); and/or a set of heater modules (e.g., heater units) configured to transiently install in infrastructure slots 126 of food module housings 120 loaded with and/or designated to receive "hot" ingredients (e.g., ingredients designated for heating).

For example, the food production system 100 can include a first food module housing 120—designated to receive a first set of "cold" ingredients—including: a first food-dispensing module 130—loaded in a first dispenser slot 124 of the first food module housing 120—configured to selectively dispense ingredients, in the first set of "cold" ingredients, into a food container arranged below the first food-dispensing module 130; and a first evaporator module—loaded in a first infrastructure slot 126 arranged below the food preparation surface 112 of the first food module housing 120—fluidly coupled to a remote refrigeration module (e.g., located in the infrastructure module housing) and configured to cool the first set of "cold" ingredients according to a first target temperature defined for ingredients in the first food module housing 120.

Further, in this example, the food production system 100 can include a second food module housing 120—designated to receive a second set of "hot" ingredients—including: a second food-dispensing module 130—loaded in a second dispenser slot 124 of the second food module housing 120—configured to selectively dispense ingredients, in the second set of "hot" ingredients, into a food container arranged below the second food-dispensing module 130; and a first heater module—loaded in a second infrastructure slot 126 arranged below the food preparation surface 112 of the second food module housing 120—configured to heat the second set of "hot" ingredients according to a second target temperature defined for ingredients in the second food module housing 120.

Therefore, in this implementation, each food module housing 120 can be configured to receive a temperature-regulating module 150—such as a cooling module 152 or a heater module—based on an ingredient type of ingredients designated for the food module housing 120.

6.2.1.1 Cooling: Food Module Housing+Cooling Module

In one implementation, as described above, each food module housing 120 designated for storing cold ingredients can transiently receive and locate a cooling module 152 within an infrastructure slot 126 arranged below the food preparation surface 112 and along the front side of the food module housing 120. Generally, the cooling module 152 includes an evaporator module including an evaporator unit and a blower configured to distribute cooled air throughout regions of the food module housing 120 containing cold ingredients, such as within the dispenser slot 124.

Additionally, in one implementation, the cooling module 152 can include a compressor unit fluidly coupled to the evaporator module and configured to provide refrigerant to the evaporator module. In particular, in one implementation, the food module housing 120 can be configured to transiently house: an evaporator module within an upper region of an infrastructure slot 126 arranged along the front side of the food module housing 120 and below the food production system 100; and a compressor unit arranged within a lower region of the infrastructure slot 126—below the upper region—arranged along the front side of the food module housing 120. In this implementation, the food module housing 120 can also include the window 129—arranged on the front side of the food module housing 120—defining an inlet region extending between the window 129 and the autonomous assembly zone 122 and interposed between the upper region and lower region of the infrastructure slot 126. An operator may therefore: access the autonomous assembly zone 122 via the window 129 and inlet region; and, by locating the cooling module 152 along the front side of the food module housing 120, readily access components (e.g., evaporator module, compressor unit) of the cooling module 152—such as by removing a front panel(s) of the food module housing 120—for servicing (e.g., replacement, troubleshooting, cleaning) of components of the cooling module 152, such as without requiring disassembly of other components of the food module housing 120 and/or neighboring food module housings 120.

Additionally or alternatively, in one implementation, rather than each module housing 120 including a front panel, the system 100 can include a single front panel spanning the sequence of module housings 120 arranged to form the makeline, thereby reducing a seam count (e.g., a number of seams) across the sequence of module housings 120 and minimizing spills and/or food debris captured within seams on exterior walls of the sequence of module housings 120. The system 100 can similarly include a singular food preparation surface 112 spanning the sequence of module housings 120 forming the makeline. In this implementation, the operator may therefore readily access components of each cooling module 152 and/or heating module 154 installed within the sequence of module housings 120 by removing this singular front panel, therefore reducing time spent by the operator removing individual panels for each module housing 120 and simplifying installation of the singular front panel.

6.2.1.2 Targeted Cooling of the Dispenser Slot

Generally, the evaporator module can include: an evaporator coil (e.g., fluidly coupled to the compressor unit) defining a capacity proportional a volume of the dispenser slot 124; and a blower configured to direct cooled air toward the first food-dispensing module 130. The food module housing 120—such as in cooperation with one or more food-dispensing modules 130 installed within the dispenser slot 124—can therefore be configured to limit dissipation of cooled air from the dispenser slot 124 into surrounding regions of the food module housing 120.

In one implementation, each food-dispensing module 130 can include a base plate—arranged about the dispenser outlet—configured to form a barrier between the dispenser slot 124 and the autonomous assembly zone 122.

In particular, the food module housing 120 can: define a dispenser slot 124 arranged above the autonomous assembly zone 122 and configured to transiently house a food-dispensing module 130; and include a base platform—interposed between the autonomous assembly zone 122 and the dispenser slot 124, defining a center bore, and configured to engage features of the food-dispensing module 130 to retain the food-dispensing module 130 within the dispenser slot 124 and locate a dispenser outlet—configured to transiently release units of the first ingredient from the first food-dispensing module 130 toward the first autonomous assembly zone 122—of the food-dispensing module 130 in a target position aligned with the center bore and above the autonomous assembly zone 122. In order to minimize gaps—through which air may flow between the dispenser slot 124 and the autonomous assembly zone 122—between the base platform and the dispenser outlet, the food-dispensing module 130 can include a base plate (e.g., a rigid or flexible plate): arranged about the dispenser outlet; and configured to engage the base platform to form a barrier between the dispenser slot 124 and the autonomous assembly zone 122, thereby minimizing flow of cooled air from the dispenser slot 124 into the autonomous assembly zone 122 while enabling flow (or "passage") of ingredients from the dispenser outlet into the container arranged within the autonomous assembly zone 122 below the food-dispensing module 130.

The cooling module 152 can therefore direct cooled air into the dispenser slot 124—such as along a particular pathway configured to maximize exposure of each food-dispensing module 130 (e.g., one, two, three, six food-dispensing modules 130) installed within the dispenser slot 124 to cooled air—to achieve a particular temperature of ingredients stored in the food-dispensing module 130. The base platform of the food-dispensing module 130 and walls of the dispenser slot 124 can then cooperate to retain cooled air within the dispenser slot 124 and minimize dissipation of cooled air into the autonomous assembly zone 122, thereby minimizing a required capacity of the evaporator coil and reducing energy and costs required for operation of the cooling module 152.

Figure 6A:
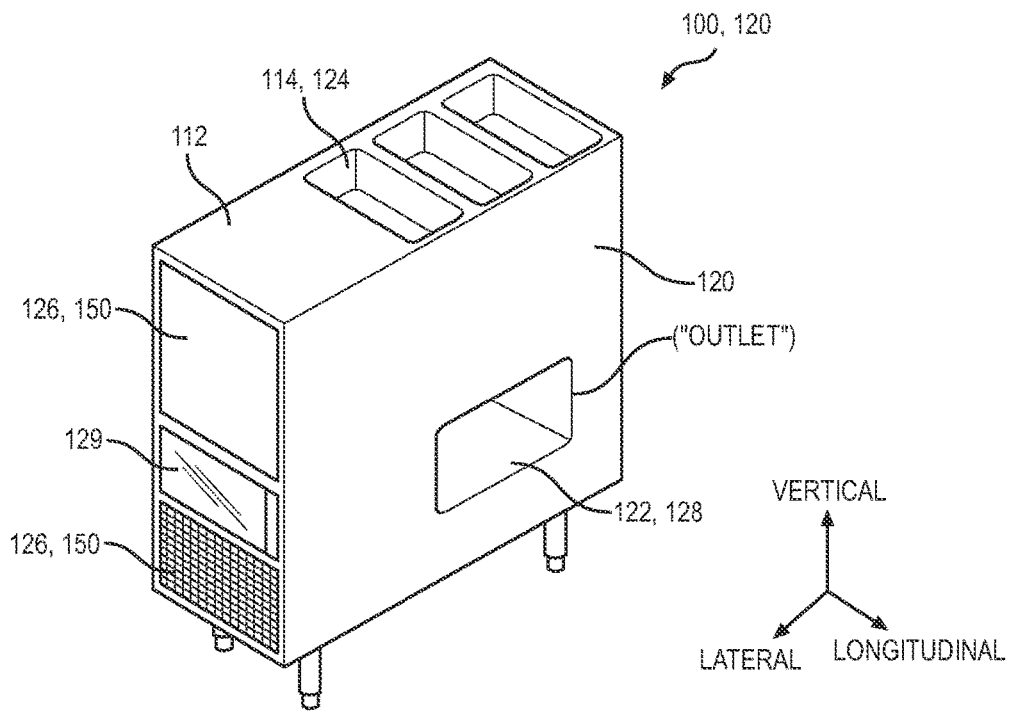
FIGS. 6A and 6B are schematic representations of one variation of the food production system.
Figure 6B:
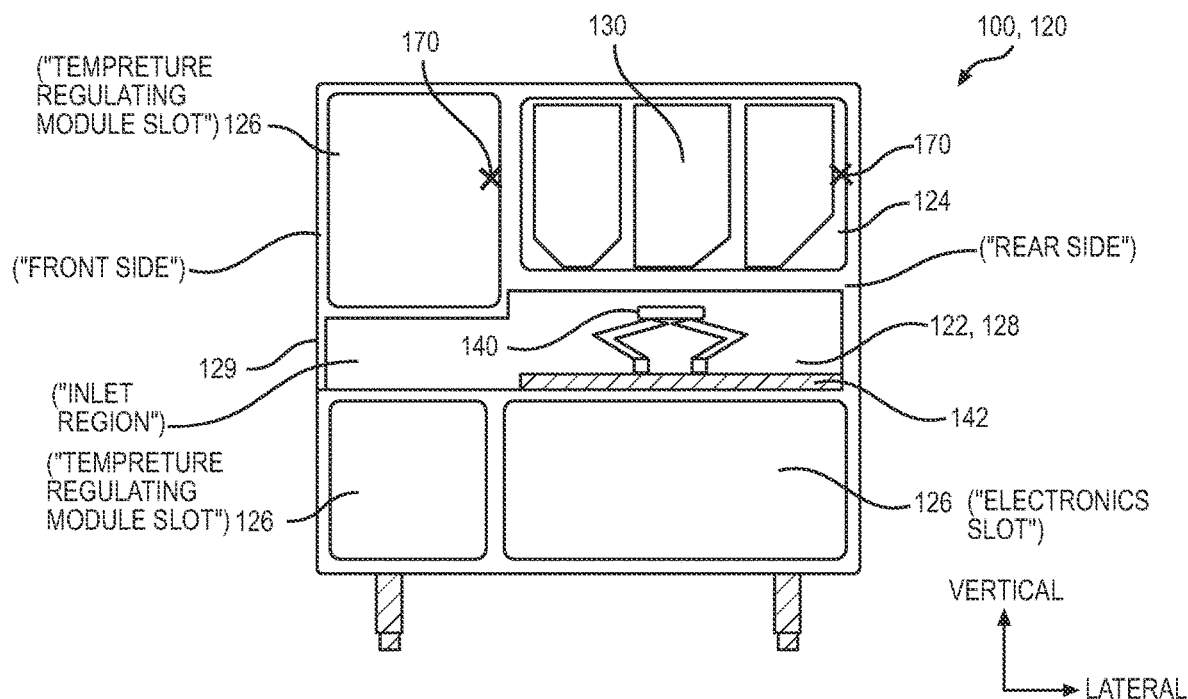
Figure 7A:
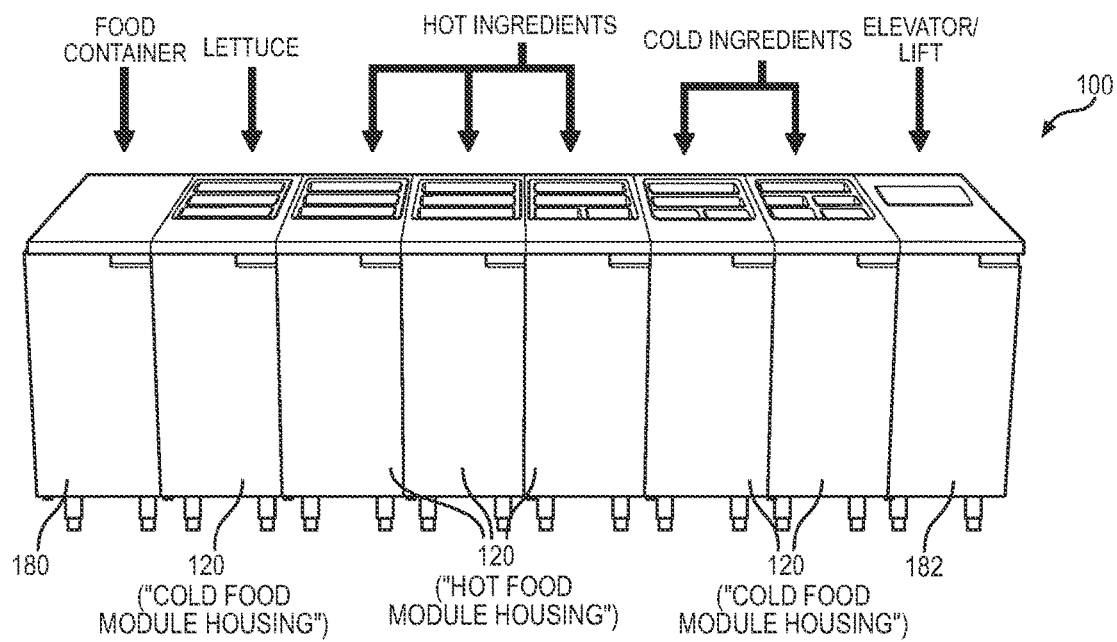
FIGS. 7A and 7B are schematic representations of one variation of the food production system.
Figure 7B:
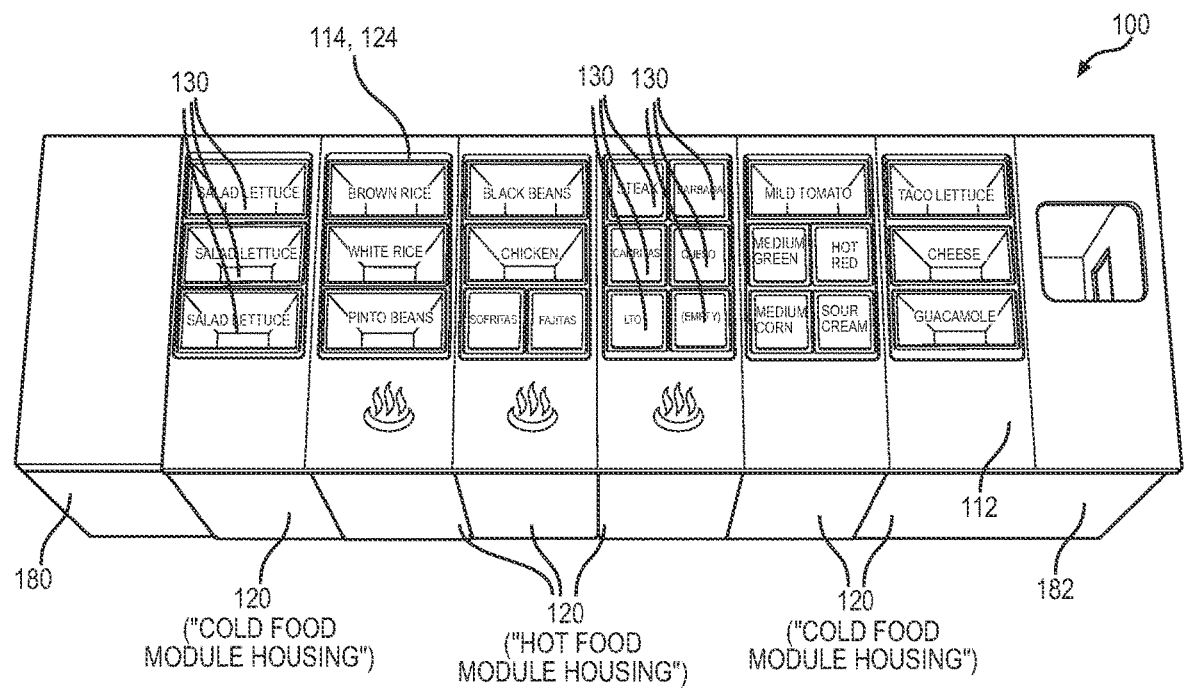

In one example, as shown in FIG. 6B, the module housing 120 can include: a first temperature sensor 170 arranged within the dispenser slot 124 and along the rear side of the module housing 120; and a second temperature sensor 170 arranged within a first infrastructure slot 126—configured to transiently house a cooling module 152 or heating module 154—adjacent the dispenser slot 124. In this example, the controller 160 can: interpret a first temperature of air at the rear side within the dispenser slot 124 based on a first signal output by the first temperature sensor 17o; interpret a second temperature of air output by a cooling module 152 arranged within the first infrastructure slot 126 based on a second signal output by the first temperature sensor 170; and, based on a target temperature—defined for ingredients stored within a set of food-dispensing modules 130 installed within the dispenser slot 124—and a difference between the first and second temperatures, selectively actuate the cooling module 152 or heating module 154 to drive the first temperature toward the target temperature.

Additionally, in one variation, in order to enable distribution or flow of cooled air across food-dispensing modules 130 loaded within a particular food module housing 120, the food module housing 120 can include a set of dividers configured to guide airflow throughout the food module housing 120 to enable cooling of each ingredient loaded in the food module housing 120 to within a target "cold" temperature range (e.g., between 35 degrees Fahrenheit and 40 degrees Fahrenheit). In particular, in one implementation, the food module housing 120 can include a set of dividers permanently installed in the food module housing 120 and defining a set of apertures configured to accept the group of food hoppers and/or set of dispenser chutes. Alternatively, in another implementation, the food module housing 120 can be configured to transiently receive a set of dividers configured to accept food hoppers and/or dispenser chutes or rigidly fixed to these food-handling modules.

For example, the food-module housing 120 can include an evaporator module located in the infrastructure slot 126. A food-dispensing module 130 including a set of dispenser chutes coupled to a group of food hoppers—designated for loading with cold ingredients—can be located in the dispenser slot 124 arranged above the positioner module 140 slot (e.g., loaded with a positioner module 140). Further, the food-dispensing module 130 can include a divider: configured to seat parallel the food preparation surface 112; extending through the set of apertures extending approximately a width of the food-module housing 120, such that the divider seats approximately flush side walls of the food-module housing 120; extending less than a length of the food-module housing 120, such that divider seats approximately flush an interior wall—arranged between the infrastructure slot 126 and the dispenser slot 124—and defines a gap between an opposite end of the divider and the rear wall of the food-module housing 120; and defining a set of apertures through which the set of dispenser chutes extend above to couple to the set of hoppers—arranged above the divider in an upper region of the dispenser slot 124—and extend below toward the dispenser chassis arranged below the divider in a lower region of the dispenser slot 124.

In this example, the divider can therefore be configured to restrict airflow between the upper and lower region to within the gap between the end of the divider—opposite the infrastructure slot 126—and the rear wall of the food module housing 120. In this example, the food module housing 120 can further define: an air inlet arranged on the interior wall between the infrastructure slot 126—containing the evaporator module— and the upper region of the dispenser slot 124; and an air outlet arranged on the interior wall between the infrastructure slot 126 and the lower region of the dispenser slot 124. A blower—installed within the infrastructure slot 126 and/or coupled to evaporator module—can therefore force cool air: across the food hoppers in the upper region of the dispenser slot 124 in a first direction via the air inlet; downward from the upper region toward the lower region via the gap defined by the divider and the rear wall of the food-module housing 120; and across the set of dispenser chutes in the lower region of the dispenser slot 124 in a second direction—opposite the first direction—and back toward the evaporator unit via the air outlet.

6.2.2 Variation: Refrigeration Module Housing: (Global) Refrigeration Module In one variation, as shown in FIG. 8B, the food production system 100 can include a refrigeration module: including a compressor; configured to transiently install in a first infrastructure slot 126 in a refrigeration-module housing 120 (e.g., coupled to and/or remote from the sequence of food module housings 120); and configured to distribute cooled refrigerant to individual evaporator modules or to groups of evaporator modules installed in food module housings 120 designated for loading with "cold" ingredients.

For example, a first food module housing 120—designated for receiving and dispensing "cold" ingredients—can include: an evaporator module—such as including an evaporator coil and blower—loaded in the infrastructure slot 126; and a set of valves fluidly coupled to the evaporator module and configured to distribute cooled refrigerant about a food-dispensing module 130—arranged in the dispenser slot 124—to cool ingredients loaded in the food-dispensing module 130 and/or set of food hoppers coupled to the food-dispensing module 130. Further, in this example, the refrigeration-module housing 120 can include a refrigeration module loaded in a first infrastructure slot 126 of the refrigeration-module housing 120 and configured to distribute cooled refrigerant to the evaporator module of the first food module housing 120.

Therefore, in this variation, the refrigeration-module can be configured to supply cooled refrigerant to each evaporator module—corresponding to each food module housing 120 designated to receive and store "cold" ingredients—in the food production system 100.

Additionally and/or alternatively, in another variation, the refrigeration-module can be configured to supply cooled refrigerant to a particular evaporator module or subset of evaporator modules installed in the food production system 100. In this variation, each evaporator module can be fluidly coupled to an adjacent evaporator module—such as transiently installed in an adjacent food module housing 120—and configured to distribute cooled refrigerant between evaporator modules.

For example, the food production system 100 can include: a first food module housing 120—designated to receive a first set of "cold" ingredients—including a first infrastructure slot 126; a second food module housing 120—designated to receive a second set of "cold" ingredients—including a second infrastructure slot 126 and coupled to the first food module housing 120; a third food module housing 120—designated to receive a third set of "cold" ingredients—including a third infrastructure slot 126 and coupled to the second food module housing 120 opposite the first food module housing 120; and an infrastructure-module housing 120—coupled to the third food module housing 120 opposite the second food module housing 120—including a refrigeration-module slot. In this example, the food production system 100 can further include: a first evaporator module transiently located within the first infrastructure slot 126 of the first food module housing 120; a second evaporator module transiently located within the second infrastructure slot 126 of the second food module housing 120; a third evaporator module transiently located within the third infrastructure slot 126 of the third food module housing 120; and a refrigeration module—including a condenser unit and a condensate-evaporator unit—transiently located within the refrigeration module slot of the infrastructure-module housing 120. In this example, during installation of the refrigeration module in the refrigeration-module slot, an operator may couple the refrigeration module to a refrigerant supply line (e.g., via a quick-connect fitting) extending from the refrigeration module slot to the third infrastructure slot 126, from the third infrastructure slot 126 to the second infrastructure slot 126, and from the second infrastructure slot 126 to the first infrastructure slot 126. The operator may similarly: couple the third evaporator module—arranged within the third infrastructure slot 126—to the refrigerant supply line; couple the second evaporator module—arranged within the second infrastructure slot 126—to the refrigerant supply line; and couple the first evaporator module—arranged within the first infrastructure slot 126—to the refrigerant supply line. Then, during operation, the refrigeration module can supply cooled refrigerant to the third evaporator module to cool ingredients stored in the third food module housing 120, which can then be distributed to the second and first evaporator modules accordingly.

Additionally, in one variation, the food production system 100 can include a heating module 154: including a radiator and/or heat exchanger subsystem; configured to transiently install in a second infrastructure slot 126 in the refrigeration-module housing 120 (e.g., coupled to and/or remote from the sequence of food module housings 120); and configured to cooperate with individual heater modules or groups of heater modules—installed in food module housings 120 designated for loading with "hot" ingredients—to heat ingredients loaded in these food module housings 120.

6.2.3 Power Modules

The food production system 100 can include a set of power modules 186 installed within module housings 120 of the food production system 100.

In one implementation, the food production system 100 can include: a first set of power modules 186—distributed between a first subset of module housings 120 (e.g., one, two, or four module housings 120) in the sequence of module housings 120—configured to receive power from a facility (e.g., an external power source within the facility) containing the food production system 100; and a second set of power modules 186—distributed between each module housing 120 in the sequence of module housings 120—configured to distribute power received from the facility to a local power supply of each module housing 120. For example, each module housing 120 can include: a 20 V and/or 4 V local power supply configured to receive power from the first set of power modules 186; and a set of ethernet cables connecting the local power supplies of each module housing 120 to the first set of power modules 186.

Further, in this implementation, the food production system 100 can include: a third power module 186—arranged in a particular module housing 120 (e.g., the elevator-module housing 120, the infrastructure module housing)—configured to receive data from the facility for supplying to a controller 160 and/or a set of local controllers 160 distributed throughout module housings 120 in the sequence of module housings 120.

In one implementation, each module housing 120 can include a set of electrical inlets configured to enable distribution of power and data between module housings 120 in the sequence of module housings 120 via wiring extending between adjacent module housings 120. In particular, each module housing 120 can include a set of electrical inlets arranged on each side of the module housing 120, such that the module housing 120 can be installed at any location within the food production system 100 and enable transfer of power and data between the module housing 120 and one or more adjacent module housings 120.

6.3 Positioner Module

The food production system 100 can further include a container positioner module 140 (hereinafter a "positioner module 140") configured to install along the autonomous assembly zone 122 and to locate a food container along the sequence of food-dispensing modules 130 as the food container is filled with ingredients according to a food order received from a patron.

Generally, each module housing 120 of the sequence of module housings 120 includes a positioner module 140 in the sequence of positioner modules 140. For example, the sequence of positioner modules 140 can include: a first positioner module 140 transiently installed within a first module housing 120; a second positioner module 140 transiently installed within a second module housing 120; and a third positioner module 140 transiently installed within a third module housing 120. Therefore, each module housing 120 includes a positioner module 140 configured to: receive a food container from an adjacent module housing 120; position the food container beneath one or more food-dispensing modules 130 transiently installed within the module housing 120; and pass the food container (e.g., via a container handoff) through a handoff window to a second positioner module 140—arranged within an adjacent module housing 120—to assemble a unit of a food product type.

In one implementation, the food production system 100 includes a sequence of positioner modules 140 arranged within the sequence of module housings 120 adjacent the sequence of food-dispensing modules 130. In this implementation, each module housing 120 can include a positioner module 140, in the sequence of positioner modules 140, extending between an inlet and an outlet of the corresponding module housing 120. Further, the conveyor can include a set of connector features configured to align and/or couple contiguous positioner modules 140, in the sequence of positioner modules 140, such that the sequence of positioner modules 140 can cooperate to transfer food containers between module housings 120 and along the sequence of food-dispensing modules 130. Additionally and/or alternatively, in this implementation, the conveyor can include a set of conveyor handoffs configured to transfer containers between contiguous positioner modules 140 in the sequence of positioner modules 140.

For example, the conveyor can be: located within the sequence of module housings 120 adjacent the sequence of food-dispensing modules 130; and configured to transfer a first food container along the sequence of food-dispensing modules 130 for dispensation of a first set of ingredients into the first food container according to a first food order. In this example, the sequence of module housings 120 can include: a first food module housing 120 configured to transiently house a first set of food-dispensing modules 130 in the sequence of food-dispensing modules 130; and a second food module housing 120 configured to transiently house a second set of food-dispensing modules 130 in the sequence of food-dispensing modules 130.

In this example, the conveyor can include: a first positioner module 140 arranged within the first food module housing 120 proximal the first set of food-dispensing modules 130 within the first food module housing 120; and a second positioner module 140 arranged within the second module housing 120 adjacent the second set of food-dispensing modules 130. The first positioner module 140 can be configured to transfer the first food container from a first inlet of the first food module housing 120 to a first outlet of the first food module housing 120—and/or below the set of food-dispensing modules 130—for dispensation of ingredients from the first set of food-dispensing modules 130 into the first food container. The second positioner module 140 can be configured to: receive the first food container at a second inlet of the second food module housing 120 from the first outlet of the first food module housing 120; and transfer the first food container from the second inlet to a second outlet of the second food module housing 120 for dispensation of ingredients from the second set of food-dispensing modules 130 into the food container. Thus, the first and second positioner modules 140 can cooperate to transfer the first container toward corresponding food-dispensing modules 130, distributed between multiple module housings 120, for loading the first container with ingredients.

Further, in the preceding example, the controller 160 can actuate the first and second positioner modules 140 independently, thereby reducing wait times for food orders by reducing wait times between dispensation of ingredients in the autonomous assembly zone 122. For example, the controller 160 can: actuate the second positioner module 140 to locate the first container adjacent a first food-dispensing module 130, in the second set of food-dispensing modules 130, located in the second food module housing 120; and halt actuation of the second positioner module 140 and actuate the first food-dispensing module 130 to dispense ingredients into the first food container. Simultaneously, during dispensation of ingredients into the first food container on the second positioner module 140, the controller 160 can: actuate the first positioner module 140 to locate a second food container adjacent a second food-dispensing module 130, in the first set of food-dispensing modules 130, located in the first food module housing 120.

6.3.1 Positioner Module: Positioner Arms+Container Platform

In one implementation, a positioner module 140—configured to install within a module housing 120—includes: a container platform configured to receive and support a base (or "bottom surface") of a food container; and a set of (e.g., two) positioner arms—flexibly coupled to the container platform and a base of the module housing 120—cooperating to support and maneuver the container platform beneath one or more food-dispensing modules 130 installed within the module housing 120.

In particular, the set of positioner arms can be configured to: constrain the container platform at a target height offset a base of the set of food-dispensing modules 130—arranged within the module housing 120—by more than a maximum food container height (e.g., six inches); and cooperate to translate and rotate the food container under one or more food-dispensing modules 130 for dispensation of ingredients—such as in a particular order and/or in a particular region of the food container—into the food container. Furthermore, the food production system 100 can include a set of conveyor actuators configured to mechanically couple to the set of positioner arms and thereby selectively drive the set of positioner arms according to commands received from the controller 160.

In one example, the module housing 120 can include: a first actuator defining a first driveshaft extending upward into the autonomous assembly zone 122; and a second actuator defining a second driveshaft (e.g., coaxial and/or laterally offset the first driveshaft) extending upward toward the dispenser slot 124. The positioner module 140 can include: a container platform configured to transiently receive and support a base of a food container (e.g., a "bowl"); a first positioner arm rotatably coupled to the container platform at a first end and configured to couple to the first driveshaft at a second end; and a second positioner arm rotatably coupled to the container platform at a third end and configured to couple to the second driveshaft at a fourth end. The controller 160 can execute commands to rotate the first and second positioner arms—via actuation of the first and second actuator—at dissimilar speeds and orientations in order to: rotate the container platform (e.g., 45 degrees, 90 degrees, 180 degrees)—loaded with the food container—over a range of positions and/or orientations within the module housing 120; sequentially locate target regions of the food container under one or more food-dispensing modules 130 within the module housing 120; concurrently or sequentially trigger these food-dispensing modules 130 to dispense ingredients (e.g., hot ingredients, cold ingredients, dry ingredients) into the food container to achieve a target (e.g., visually-appealing, visually—balanced, physically-balanced) ingredient plating for the food container; and thus achieve high food container through-put and accurate and repeatable plating of custom combinations of ingredients.

6.3.1.1 Autonomous Assembly Zone: Flexible Tray

In one implementation—in which the positioner assembly includes the set of positioner arms and the container platform as described above—the food module housing 120 can further include a flexible tray 142: configured to transiently install within the autonomous assembly zone 122 below the positioner assembly; and configured to collect food debris, such as during dispensation of ingredients into the food container.

In this implementation, the autonomous assembly zone 122 can define a fixed height approximating and/or exceeding a combined height of the flexible tray 142, the set of positioner arms, the container platform, and the food container. Therefore, by minimizing a quantity of moving parts (e.g., such as required for a conveyor belt system) in the positioner module 140 and minimizing a vertical height of the positioner module 140—defined by the set of positioner arms and the container platform—the module housing 120 can accommodate a tray height of the flexible tray 142 within the autonomous assembly zone 122. By including this flexible tray 142 within the autonomous assembly zone 122 during assembly of food products, the flexible tray 142 can limit an amount of food debris spilled or released (e.g., unintentionally) onto interior surfaces of the food module housing 120 (e.g., other than the flexible tray 142), thereby reducing resources dedicated to cleaning these surfaces.

Furthermore, an operator may open and/or reach through the window 129—arranged on the front side of the food module housing 120—to access the autonomous assembly zone 122 and therefore readily remove the flexible tray 142 for cleaning and/or to re-install the flexible tray 142 in preparation for assembly of units of the food product type.

For example, the food module housing 120 includes: a set of positioner actuators arranged below the autonomous assembly zone 122 and defining a set of driveshafts extending into the autonomous assembly zone 122; a positioner module 140—arranged within the autonomous assembly zone 122—including a set of positioner arms coupled to the set of driveshafts and a conveyor platform coupled to the set of conveyor arms opposite the set of driveshafts; and a flexible tray 142 (e.g., a drip tray) configured to transiently install below the positioner assembly within the autonomous assembly zone 122. In particular, the flexible tray 142 can define: a set of cutouts (e.g., one cutout, two cutouts) configured to nest over the set of driveshafts to locate the flexible tray 142 within the autonomous assembly zone 122; and a tray geometry—such as a shape and/or size—approximating a geometry of the autonomous assembly zone 122, such that the flexibly tray extends about the set of driveshafts and toward walls of the autonomous assembly zone 122, thereby forming a floor of the autonomous assembly zone 122. Additionally or alternatively, in one example, the flexible tray 142 can define a tray cross-sectional area exceeding a cross-sectional area of the autonomous assembly zone 122, such as edges of the flexible tray 142 extending upward against walls of the autonomous assembly zone 122.

In one example, at a start of an assembly period, an operator may: insert the flexible tray 142 through the window 129 and into the autonomous assembly zone 122; locate the set of cutouts over the set of driveshafts; insert the set of cutouts over the set of driveshafts to install the flexible tray 142 within the autonomous assembly zone 122; and couple the set of positioner arms—coupled to the container platform—to the set of driveshafts to mechanically couple the set of positioner arms to the set of positioner actuators arranged below the autonomous assembly zone 122. Later, to remove the flexible tray 142 for cleaning, the operator may: reach through the window 129 to access the autonomous assembly zone 122 and decouple the positioner module 140 from the set of driveshafts; lift the flexible tray 142 upward over the set of driveshafts; and remove the flexible tray 142 for cleaning.

Alternatively, in another example, the flexible tray 142 can define a set of slits extending between an outer edge of the flexible tray 142 and the set of cutouts. In this example, rather than remove the positioner module 140 in order to install and/or remove the flexible tray 142, the operator may install the flexible tray 142 by threading the set of driveshafts through the set of slits to locate the set of driveshafts within the set of cutouts.

Additionally or alternatively, in one implementation, the flexible tray 142 can define a set of tray walls of a fixed tray height configured to substantially and/or partially cover interior walls of the autonomous assembly zone 122 to prevent spilling of food debris onto these interior walls.

Furthermore, the set of tray walls can be configured to cover the window 129—such as defining an opening in the front side of the module housing 120—to prevent food spills outward from the autonomous assembly zone via the window 129. In particular, in this implementation, the flexible tray 142 can define the set of tray walls of the fixed tray height approximating and/or less than—and within a threshold difference of—a window height of the window 129. The flexible tray 142—such as defining a rubber container or tub—can therefore fill and/or approximately span the window 129 when installed within the autonomous assembly zone 122. An operator may therefore remove the flexible tray 142 via the window 129 to enable access to the autonomous assembly zone 122 and/or to other components—such as including the positioner module 140—arranged within the autonomous assembly zone 122.

6.3.2 Positioner Module: Conveyor Belt Assembly

In one variation, the positioner module 140 includes a set of (e.g., two) conveyor belts: laterally offset and mirrored across the longitudinal axis of the food production system 100; and cooperating to support short, opposing segments of a rim of a food container. The set of conveyor belts of the positioner module 140 can include: a first conveyor belt extending parallel to and laterally offset behind the longitudinal assembly axis; and a second conveyor belt extending parallel to and laterally offset in front of the longitudinal assembly axis. The second conveyor belt is configured to cooperate with the first conveyor belt to support a rim of a food container with a base of the food container extending below the first conveyor belt and the second conveyor belt.

For example, the first and second conveyor belt: can be configured to be laterally offset by approximately the common width of a set of food containers; are offset above a base of the food production system 100 by more than a maximum food container 115 height (e.g., 6.0"); and cooperate to support the underside of the rim of each food container 115 at two narrow areas (or "points") on opposite sides of the rim. Accordingly, the first and second conveyor belt can accommodate food containers of various depths without necessitating a physical change to the food production system 100. The first and second conveyor belt can therefore also maintain top edges of food containers of any depth at common vertical positions under the food-dispensing module 130—such as 0.5" below output ports of the food-dispensing modules 130 to enable ingredients to fully empty from these food-dispensing modules 130 while limiting opportunity for these ingredients to spill from these food containers.

Additionally or alternatively, in this variation, the positioner module 140 can be segmented within a module housing 120 such that the positioner module 140 can transport multiple food containers—corresponding to different food orders—individually and/or non-linearly (e.g., at different rates, to different food-dispensing modules 130) within the autonomous assembly zone 122.

For example, the positioner module 140 can include: a first conveyor segment (or "conveyor unit") extending between a first food-dispensing module 130 and a second food-dispensing module 13o; and a second conveyor segment extending between the second food-dispensing module 130 and a third food-dispensing module 130. In this example, the controller 160 can actuate the first conveyor segment to move a first food container from the first food-dispensing module 130 to the second food-dispensing module 130. As the first food container is filled with a first ingredient in the first food-dispensing module 130, the controller 160 can again actuate the first conveyor segment to move a second food container from the first food-dispensing module 130 toward the second food-dispensing module 130. If, however, the second food container corresponds to a food order not including the first ingredient, the controller 160 can actuate the second conveyor segment to move the second food container past the second food-dispensing module 130 and toward a third food-dispensing module 130. Therefore, the controller 160 can continue to actuate the second conveyor segment to move the second food container past the first food container for filling with other ingredients and/or completion of the food order, rather than wait for the first food container at the second food-dispensing module 130.

6.4 Container Dispensing Module

In one implementation, as described above, the food production system 100 can include a container-module housing 120 configured to transiently house a set of container-dispensing modules configured to dispense containers for loading with ingredients stored within the food production system 100. In one example, the container-module housing 120 can be configured to receive a set of container dispensing modules— within the set of container-dispenser slots 124—including: a first container dispensing module configured to dispense containers of a first size (e.g., a small size) and configured to hold units of a first food product (e.g., cold food bowls); a second container dispensing module configured to dispense containers of a second size (e.g., a large size) and configured to hold units of the first food product; a third container dispensing module configured to dispense containers of the first size and configured to hold units of a second food product (e.g., hot food bowls); a fourth container dispensing module configured to dispense containers of the second size and configured to hold units of the second food product; and a fifth container dispensing module configured to dispense containers of a third size and configured to hold volumes of sauces, dressings, and/or dips. The controller 160 can then trigger dispensation of a particular container, via the first, second, third, fourth, and/or fifth container dispensing modules 125, onto the positioner module 140 according to food orders received.

6.5 Variation: Food-Staging Module

In one variation, the food production system 100 includes a module housing 120, in the sequence of module housings 120, configured to transiently house a sequence of food-staging modules configured to prepare a unit of a food product—loaded with a set of ingredients according to a corresponding food order submitted by a patron—for presentation to the patron.

For example, the food production system 100 can include a sequence of module housings 120 including: a container module housing 180 configured to transiently house a set of container dispensing modules 125; a sequence of food module housings 120 configured to receive a food container from the first module housing 120 and configured to transiently house a sequence of food-dispensing modules 13o; and a food-staging module housing 182 configured to receive the food container from the sequence of food module housings 120 and configured to transiently house a sequence of food-staging modules configured to prepare a unit of a food product—corresponding to the food container—for presentation to a patron associated with the unit of the food product. The food-staging module housing 182 can be coupled to a final food module housing 120, in the sequence of food module housings 120, such that an inlet of the food-staging module housing 182 is aligned with an outlet of the final food module housing 120, thereby enabling transfer of food containers from within the final food module housing 120 to within the food-staging module.

In this example, the sequence of food-staging modules can include: a set of lid dispensing modules configured to dispense a particular lid—matched to the food order and/or the food container—onto the food container; a labelling module configured to dispense (e.g., print) a set of labels matched to the food order—such as displaying a name of the patron associated with the food order and/or a food product type associated with the food order—and affix the set of labels to the lid and/or food container; and a serving module 184 (e.g., a food elevator 184) configured to direct the assembled unit of the food product (e.g., in the food container) toward the food preparation surface 112 for collection by a worker and/or presentation to the patron.

In one implementation, the food production system includes an elevator module 184—such as arranged in a food-staging module housing 182 coupled to a final food module housing 120 in the sequence of food module housings 120—configured to raise the food container from the autonomous assembly zone 122 toward the food preparation surface 112 for collection by an operator and/or handoff to a patron associated with a food order assembled in the food container.

6.6 Controller

The food production system 100 can include a controller 160 configured to intake food orders from patrons and to selectively actuate the food processing and dispensing modules to construct instances of a food product according to these food orders. More specifically, the food production system 100 can include an integrated controller 160 configured to: receive or access orders submitted by patrons via a user interface (e.g., arranged on a customer-facing façade of the food production system 100, arranged within a food establishment (e.g., a ghost kitchen), or within a native food ordering application executing on user's mobile computing device) and/or via direct interaction with an employee; and handle autonomous fulfillment of these orders by triggering actuation of food dispensing and processing modules in the food production system 100.

In one implementation, the controller 160 can: receive a food order; coordinate motion of the sequence of positioner modules 140—arranged within the sequence of module housings 120—to locate the food container below the sequence of food-dispensing modules 130 according to the food order; and selectively trigger food-dispensing modules 130, in the sequence of food-dispensing modules 130, to dispense amounts of ingredients into the food container to assemble a unit of the food product type according to the food order.

The food production system 100 can also include a wireless communication module coupled to the controller 160 and configured to: receive food orders for patrons; communicate errors, order fulfillment data, and/or fill status of food-dispensing modules 130 in the food production system 100 to a remote computer system; and receive control-related updates executable by the controller 160 when processing food orders. Alternatively, the controller 160 and wireless communication module (and/or other controls- and communications-related subsystems) can be arranged in a controls module configured to transiently install in a food production system 100.

In one variation, food-dispensing modules 130 include a sub-controller 160 configured to locally control dispensation of metered volumes of an ingredient contained in this food-dispensing module 130—such as by implementing closed-loop controls to drive actuators in the food-dispensing module 130 based on outputs of various sensors 170 integrated into the food-dispensing module 130—responsive to receipt of a command from the controller 160 to dispense this amount of the ingredient.

6.7 Sensors

The food production system 100 can include a suite of sensors 170 arranged within the sequence of module housings 120 and configured to output signals representing conditions within the sequence of module housings 120.

In one implementation, each food module housing 120 can include a set of temperature sensors 170 arranged within and/or proximal the dispenser slot 124 and configured to output signals representing temperature of ingredients stored in one or more food-dispensing modules 130 arranged within the dispenser slot 124. In this implementation, the controller 160 can: interpret a timeseries of temperatures of ingredients stored within food-dispensing modules 130 based on signals output by the set of sensors 170; and selectively actuate a cooling and/or heating module 154 installed within the food module housing 120 based on the timeseries of temperatures.

For example, a first food module housing 120 can include: a first food-dispensing module 130 configured to transiently store and dispense units of a "cold" ingredient; a first temperature sensor 170 arranged proximal the first food-dispensing module 130 and configured to output signals representing temperature of "cold" ingredients stored within the first food-dispensing module 130; and a cooling module 152 configured to cool ingredients stored in the first food-dispensing module 130. In this example, the controller 160 can: interpret a first temperature of units of the "cold" ingredient stored within the first food-dispensing module 130 based on a first signal output by the first temperature sensor 170; and selectively trigger actuation of the cooling module 152 based on the first temperature and a first target temperature defined for the "cold" ingredient, such as in order to drive the first temperature toward the first target temperature. Additionally or alternatively, a second module housing 120 can include: a second food-dispensing module 130 configured to transiently store and dispense units of a "warm" ingredient; a second temperature sensor 170 arranged proximal the second food-dispensing module 130 and configured to output signals representing temperature of "warm" ingredients stored within the second food-dispensing module 130; and a heating module 154 configured to heat ingredients stored in the second food-dispensing module 130. The controller 160 can: interpret a second temperature of units of the "warm" ingredient stored within the second food-dispensing module 130 based on a second signal output by the second temperature sensor 170; and selectively trigger actuation of the heating module 154 based on the second temperature and a second target temperature defined for the "warm" ingredient, such as in order to drive the second temperature toward the second target temperature.

Additionally or alternatively, in another implementation, the food production system 100 can include a set of sensors 170 configured to output signals representing presence and/ or absence of components (e.g., modules) of the food production system 100, such as prior to assembly of food products within the autonomous assembly zone 122. For example, each module housing 120 can include a LiDAR sensor 170 configured to output signals representing presence and/or absence of the set of food-dispensing modules 130, the positioner module 140, and/or the flexible tray 142 within the food module housing 120. The controller 160 can thus: read a signal output by the LiDAR sensor 170; interpret presence and/or absence of the set of food-dispensing module 130 based on features extracted from the signal; interpret presence and/or absence of the positioner module 140 based on features extracted from the signal; and interpret presence and/or absence of the flexible tray 142 based on features extracted from the signal. In response to detecting absence of one or more of these components, the food production system 100 can: generate a notification indicating absence of a corresponding components of the food production system 100; and transmit the notification to an operator associated with the food production system 100, such as prior to enabling autonomous assembly of food products within the autonomous assembly zone 122.

7. Example Configuration

In one example configuration, the food production system 100 can include a sequence of module housings 120 forming a makeline defining a front side (or "food-handling side")—such as facing an operator associated with the food production system 100—and a rear side (or "customer-facing side") opposite the front side.

The sequence of module housings can include a first module housing 120: supporting a food preparation surface 112 defining a receptacle 114 configured to transiently receive food-dispensing modules 130 for loading into the first module housing 120; defining a dispenser slot 124 extending downward from and below the receptacle 114 and arranged along the rear side; and configured to transiently house a first food-dispensing module 130—loaded with units of a "cold" ingredient (e.g., a refrigerated ingredient)—within the dispenser slot 124. An operator may therefore manually insert (e.g., drop) the first food-dispensing module into the dispenser slot 124—via the receptacle 114—with an upper rim of the first food-dispensing module 130 seating within the receptacle 114 approximately flush the food preparation surface 112.

The first module housing 120 can: define an autonomous assembly zone 122—extending along a longitudinal assembly axis—arranged beneath the dispenser slot 124, such that the first food-dispensing module 130 transiently dispenses ingredients vertically downward toward the autonomous assembly zone 122; define a positioner slot 128 arranged within the autonomous assembly zone 122 and including a set of positioner actuators; and be configured to transiently house a positioner module 140 within the positioner slot 128, the positioner module 140 including a container platform configured to support a food container and a set of positioner arms—coupled to the container platform—configured to mechanically couple to the set of positioner actuators to rotate the container platform about and along the longitudinal assembly axis within the autonomous assembly zone to locate the food container below food-dispensing modules 130 in the first module housing 120. The autonomous assembly zone 122—arranged beneath the dispenser slot 124—can therefore similarly be arranged along and/or proximal the rear side.

Furthermore, the first module housing 120 can: define a first infrastructure slot 126—defining an upper region and a lower region—arranged beneath the food preparation surface 112 along the front side; be configured to transiently house a cooling module 152—including an evaporator unit (e.g., an evaporator and a blower) arranged in the upper region and a compressor unit arranged in the lower region—configured to supply cooled air to the dispenser slot 124 to cool ingredients within the first food-dispensing module 130 to a target "cold" temperature; and define an inlet region—interposed between the upper and lower regions of the first infrastructure slot 126 and extending into the autonomous assembly zone 122—such that fluid and/or electrical connections between the evaporator and compressor units are routed about inlet region within the first module housing 120. The first module housing 120 can therefore include a window 129—arranged along the front side and facing (e.g., in alignment with) the inlet region—configured to enable an operator to open the window 129 and reach into the autonomous assembly zone 122, such as to install and/or remove the positioner module 140 and/or to install and/or remove a flexible tray 142 transiently arranged beneath the positioner module 140 within the autonomous assembly zone 122.

Finally, the first module housing 120 can define a second infrastructure slot 126 (or a "basement" slot), arranged beneath the autonomous assembly zone 122 and configured to house a set of electronics, power modules, the set of positioner actuators, and/or the controller 160.

The sequence of module housings can similarly include a second module housing 120: supporting the food preparation surface 112 defining a second receptacle 114 configured to transiently receive food-dispensing modules 130 for loading into the second module housing 120; defining a second dispenser slot 124 extending downward from and below the second receptacle 114 and arranged along the rear side; and configured to transiently house a second food-dispensing module 130—loaded with units of a "hot" ingredient (e.g., a heated ingredient)—within the second dispenser slot 124. The second module housing 120 can: define a second autonomous assembly zone 122—extending along the longitudinal assembly axis—arranged beneath the second dispenser slot 124, such that the second food-dispensing module 130 transiently dispenses ingredients vertically downward toward the second autonomous assembly zone 122; define a second positioner slot 128 arranged within the second autonomous assembly zone 122 and including a second set of positioner actuators; and be configured to transiently house a second positioner module 140 within the second positioner slot 128. The second autonomous assembly zone 122—arranged beneath the second dispenser slot 124—can therefore similarly be arranged along and/or proximal the rear side.

Furthermore, the second module housing 120 can: define a third infrastructure slot 126—defining an upper region and a lower region—arranged beneath the food preparation surface 112 along the front side; be configured to transiently house a heating module 154—including a heater (e.g., and a blower—configured to supply warm air to the second dispenser slot 124 to heat ingredients within the second food-dispensing module 130 to a target "hot" temperature; and define a second inlet region—interposed between the upper and lower regions of the third infrastructure slot 126 and extending into the second autonomous assembly zone 122—such that fluid and/or electrical connections between components of the heating module 154 are routed about the second inlet region within the second module housing 120. The second module housing 120 can therefore include a second window 129—arranged along the front side and facing (e.g., in alignment with) the second inlet region—configured to enable an operator to open the second window 129 and reach into the second autonomous assembly zone 122, such as to install and/or remove the second positioner module 140 and/or to install and/or remove a second flexible tray 142 transiently arranged beneath the second positioner module 140 within the second autonomous assembly zone 122. Finally, the second module housing 120 can define a fourth infrastructure slot 126 (or a "basement" slot), arranged beneath the second autonomous assembly zone 122 and configured to house a second set of electronics, power modules, the second set of positioner actuators, and/or control modules.

The sequence of module housings 120 can further include additional "hot" or "cold" module housings. Furthermore, the food production system 100 can include: a container module housing 180—arranged on a first end of the make-line—configured to transiently supply food containers to a first unit of the positioner module 140 for transport along the longitudinal assembly axis through the sequence of module housings 120; and/or a food-staging housing 182 including an elevator module 184 configured to lift a food container—loaded with ingredients according to a food order—from the autonomous assembly zone 122 toward the food preparation surface 112.

8. (Re)Assembly

In one implementation, to clean, replace, and/or redistribute modules within the food production system 100, an operator may remove food dispensing, infrastructure, conveyor, and/or container-dispensing modules from designated slots within the sequence of module housings 120 of the food production system 100. These modules can then be cleaned and reinstalled in designated slots in the sequence of module housings 120 or replaced with different modules in order to reconfigure the food production system 100, such as to include additional or fewer ingredients, modify an order of ingredient dispensation, replace food containers with new food containers of a different size or shape, etc.

For example, during a first time period, a module housing 120 can be configured to: transiently house a first food-dispensing module 130—configured to transiently store units of a "cold" ingredient—within the dispenser slot 124 arranged along a rear side of the module housing 120; and transiently house a cooling module 152—configured to cool ingredients stored in the dispenser slot 124—within an infrastructure slot 126 arranged along a front side of the module housing 120 (e.g., facing an operator). Then, during a second time period, the module housing 120 can be configured to: transiently house a second food-dispensing module 130—configured to transiently store units of a "hot" ingredient—within the dispenser slot 124; and transiently house a heating module 154—configured to heat ingredients stored in the dispenser slot 124—within the infrastructure slot 126. In this example, at a first time succeeding the first time period and preceding the second time period, an operator may: remove the first food-dispensing module 130 from the dispenser slot 124 via the aperture in the food preparation surface 112; remove the cooling module 152 from the infrastructure slot 126 arranged on the front side of the module housing 120, such as by removing a front panel of the module housing 120; install a heating module 154 within the infrastructure slot 126 in replacement of the cooling module 152 (and replacing the front panel); and insert the second food-dispensing module 130 into the dispenser slot 124 via the aperture. The module housing 120 can therefore be re-configured over time in order to accommodate different ingredient types, such as including "cold" and "hot" ingredients.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:
1. A food production system comprising:
a food preparation surface arranged at a work surface height and defining a receptacle configured to transiently receive a set of food-dispensing modules configured to store and dispense ingredients for preparation of units of a food product type;
a first module housing:
arranged below and supporting the food preparation surface at the work surface height;
defining a first autonomous assembly zone extending along a longitudinal assembly axis;
configured to transiently house a first food-dispensing module, in the set of food-dispensing modules, configured to seat above the longitudinal assembly axis and dispense units of a first ingredient toward the first autonomous assembly zone;
configured to transiently house a cooling module configured to cool ingredients transiently stored in the first food-dispensing module;
comprising a first positioner module arranged within the first autonomous assembly zone, below the first food-dispensing module, and configured to transiently locate a food container below the first food-dispensing module for dispensation of the first ingredient into the food container; and
comprising a first window:
arranged adjacent the first autonomous assembly zone on a first front side of the first module housing laterally offset the longitudinal assembly axis; and
configured to provide user access to the first autonomous assembly zone;

a second module housing:
  arranged below and supporting the food preparation surface at the work surface height;
  defining a second autonomous assembly zone extending along the longitudinal assembly axis;
  configured to transiently house a second food-dispensing module, in the set of food-dispensing modules, configured to seat above the longitudinal assembly axis and dispense units of a second ingredient toward the second autonomous assembly zone;
  configured to transiently house a heating module configured to heat ingredients transiently stored in the second food-dispensing module;
  comprising a second positioner module arranged within the second autonomous assembly zone, below the second food-dispensing module, and configured to transiently locate the food container below the second food-dispensing module for dispensation of the second ingredient into the food container; and
  comprising a second window:
    arranged adjacent the second autonomous assembly zone on a second front side of the second module housing laterally offset the longitudinal assembly axis, the second front side of the second module housing arranged coplanar the first front side of the first module housing; and
    configured to provide user access to the second autonomous assembly zone; and
a controller configured to:
  receive a food order;
  coordinate motion of the first positioner module and the second positioner module to selectively locate the food container below the set of food-dispensing modules according to the food order; and
  selectively trigger the set of food-dispensing modules to dispense amounts of ingredients into the food container to assemble a unit of the food product type according to the food order.

2. The system of claim 1:
wherein the first window defines an inlet region extending between the first window and the first autonomous assembly zone; and
wherein the first module housing is configured to transiently house the cooling module comprising:
  a compressor unit configured to transiently install within a first infrastructure slot arranged below the inlet region; and
  an evaporator module configured to transiently install within a second infrastructure slot arranged above the inlet region and below the food preparation surface and comprising:
    an evaporator coil fluidly coupled to the compressor unit; and
    a blower configured to direct cooled air toward the first food-dispensing module.

3. The system of claim 1:
wherein the first module housing is configured to transiently house the cooling module comprising an evaporator unit and a first blower configured to direct cool air towards the first food-dispensing module to cool units of the first ingredient stored within the first food-dispensing module; and
wherein the second module housing is configured to transiently house the heating module comprising a heater unit and a blower configured to direct warm air towards the second food-dispensing module to heat units of the second ingredient stored within the second food-dispensing module.

4. The system of claim 1:
wherein the first positioner module comprises a first set of conveyor belts configured to support a rim of the food container;
wherein the second positioner module comprises a second set of conveyor belts configured to support the rim of the food container; and
wherein the controller is configured to:
  selectively trigger the first set of conveyor belts to advance by a first set of distances to transiently locate the food container below the first food-dispensing module; and
  selectively trigger the second set of conveyor belts to advance by a second set of distances to transiently locate the food container below the second food-dispensing module.

5. The system of claim 1:
wherein the first positioner module comprises:
  a first container platform configured to support a base of the food container; and
  a first set of positioner arms flexibly coupled to the first container platform;
wherein the first module housing comprises:
  a first set of arm actuators arranged below the first autonomous assembly zone and defining a first set of driveshafts extending vertically upward and configured to mechanically couple to the first set of positioner arms; and
  a first flexible tray configured to transiently install below the first positioner module and about the first set of driveshafts to collect food debris;
wherein the controller is configured to trigger actuation of the first set of actuators to drive motion of the first set of positioner arms to locate the first container platform below the first food-dispensing module for dispensation of units of the first ingredient into the food container arranged on the first container platform; and
wherein the first window is configured to enable removal of the first flexible tray from the first module housing for cleaning and installation of the first flexible tray within the first module housing for collecting food debris during assembly of units of the food product type.

6. The system of claim 5:
wherein the first flexible tray, the first set of positioner arms, the first container platform, and the food container cooperate to define a first height;
wherein the first autonomous assembly zone defines a fixed height exceeding the first height; and
wherein the second autonomous assembly zone defines the fixed height.

7. The system of claim 5:
wherein the second positioner module comprises:
  a second container platform configured to support the base of the food container; and
  a second set of positioner arms flexibly coupled to the second container platform;
wherein the second module housing comprises:
  a second set of arm actuators arranged below the second autonomous assembly zone and defining a second set of driveshafts extending vertically upward and configured to mechanically couple to the second set of positioner arms; and a second flexible tray configured to transiently install below the second positioner module and about the second set of driveshafts;

wherein the controller is configured to trigger actuation of the second set of actuators to drive motion of the second set of positioner arms to locate the second container platform below the second food-dispensing module for dispensation of units of the second ingredient into the food container arranged on the second container platform; and wherein the second window is configured to enable removal of the second flexible tray from the second module housing for cleaning and installation of the second flexible tray within the second module housing for collecting food debris during assembly of units of the food product type.

8. The method of claim 1:

wherein the first module housing defines:
a first dispenser slot extending below the receptacle and arranged along a first rear side of the first module housing opposite the first front side and above the first autonomous assembly zone; and
a first infrastructure slot arranged adjacent the first dispenser slot, below the food preparation surface, and along the first front side of the first module housing;

wherein the first module housing is configured to:
transiently house the first food-dispensing module within the first dispenser slot; and
transiently house the cooling module within the first infrastructure slot;

wherein the second module housing defines:
a second dispenser slot extending below the receptacle and arranged along a first rear side of the second module housing opposite the second front side and above the second autonomous assembly zone; and
a second infrastructure slot arranged adjacent the second dispenser slot, below the food preparation surface, and along the second front side of the second module housing; and wherein the second module housing is configured to:
transiently house the second food-dispensing module within the second dispenser slot; and
transiently house the heating module within the second infrastructure slot.

9. The system of claim 1, wherein the first module housing is configured to:
during a first time period:
transiently house the first food-dispensing module configured to transiently store and dispense units of the first ingredient comprising a first cold ingredient; and
transiently house the cooling module configured to cool ingredients in the first food-dispensing to temperatures within a first temperature range defined for the first cold ingredient; and
during a second time period succeeding the first time period:
transiently house a third food-dispensing module, in replacement of the first food-dispensing module, configured to transiently store and dispense units of a first warm ingredient different from the first cold ingredient; and
transiently house a second heating module, in replacement of the cooling module, configured to heat ingredients in the third food-dispensing module to temperatures within a second temperature range defined for the first warm ingredient, temperatures within the second temperature range exceeding temperatures within the first temperature range.

10. The system of claim 1:

wherein the first module housing:
defines a first dispenser slot arranged above the first autonomous assembly zone and configured to transiently house the first food-dispensing module; and
comprises a base platform:
interposed between the first autonomous assembly zone and the first dispenser slot;
defining a center bore; and
configured to engage features of the first food-dispensing module to retain the first food-dispensing module within the first dispenser slot and locate a dispenser outlet of the first food-dispensing module in a target position aligned with the center bore and above the first autonomous assembly zone; and wherein the first food-dispensing module comprises:
the dispenser outlet configured to transiently release units of the first ingredient from the first food-dispensing module toward the first autonomous assembly zone; and
a base plate defining an aperture aligned with the dispenser outlet and configured to:
form a barrier between the first dispenser slot and the first autonomous assembly zone to minimize flow of cooled air from first dispenser slot into the first autonomous assembly zone; and
enable flow of ingredients from the dispenser outlet toward the first autonomous assembly zone via the aperture.

11. The system of claim 1:

wherein the first module housing:
defines a first dispenser slot coextensive the receptacle of the food preparation surface and arranged above the first autonomous assembly zone; and
is configured to transiently house the first food-dispensing module within the first dispenser slot, the first food-dispensing module configured to:
transiently store units of the first ingredient for manual preparation of units of the food product type at the food preparation surface; and
transiently dispense units of the first ingredient toward the first autonomous assembly zone for autonomous assembly of units of the food product type within the first autonomous assembly zone; and wherein the second module housing:
defines a second dispenser slot coextensive the receptacle of the food preparation surface and arranged above the second autonomous assembly zone; and
is configured to transiently house the second food-dispensing module within the second dispenser slot, the second food-dispensing module configured to:
transiently store units of the second ingredient for manual preparation of units of the food product type at the food preparation surface; and
transiently dispense units of the second ingredient toward the second autonomous assembly zone for autonomous assembly of units of the food product type within the second autonomous assembly zone.

12. The system of claim 1:

wherein the first module housing comprises a first flexible tray configured to:

transiently seat below the first positioner module within the first autonomous assembly zone; and collect food debris during assembly of units of the food product type within the first module housing;

wherein the first window is configured to provide user access to the first autonomous assembly zone for installation and removal of the first flexible tray from the first autonomous assembly zone for cleaning;

wherein the second module housing comprises a second flexible tray configured to:

transiently seat below the second positioner module within the second autonomous assembly zone; and collect food debris during assembly of units of the food product type within the second module housing; and wherein the second window is configured to provide user access to the second autonomous assembly zone for installation and removal of the second flexible tray from the second autonomous assembly zone for cleaning.

13. The system of claim 1:

wherein the first module housing is configured to transiently house:

the first food-dispensing module configured to transiently store and dispense units of the first ingredient defining a first target temperature range;

a third food-dispensing module configured to transiently store and dispense units of a third ingredient defining the first target temperature range; and the cooling module configured to cool ingredients in the first food-dispensing module and ingredients in the second food-dispensing module to temperatures within the first target temperature range; and wherein the controller is configured to coordinate motion of the first positioner module to selectively locate the food container:

beneath the first food-dispensing module, within the first autonomous assembly zone of the first module housing, according to the food order; and beneath the second food-dispensing module, within the first autonomous assembly zone of the first module housing, according to the food order.

14. The system of claim 1:

wherein the first module housing comprises a first temperature sensor arranged proximal the first food-dispensing module and configured to output signals representing temperature of ingredients stored within the first food-dispensing module;

wherein the second module housing comprises a second temperature sensor arranged proximal the second food-dispensing module and configured to output signals representing temperature of ingredients stored within the second food-dispensing module; and wherein the controller is configured to:

interpret a first temperature of units of the first ingredient stored within the first food-dispensing module based on a first signal output by the first temperature sensor;

interpret a second temperature of units of the second ingredient stored within the second food-dispensing module based on a second signal output by the second temperature sensor;

selectively trigger actuation of the cooling module based on the first temperature and a first target temperature defined for the first ingredient; and selectively trigger actuation of the heating module based on the second temperature and a second target temperature defined for the second ingredient.

15. The system of claim 1:

further comprising a third module housing:

supporting the food preparation surface;

configured to transiently house a container-dispensing module configured to store and dispense food containers for preparation of units of the food product type within food containers; and defining a first outlet arranged on a first side of the third module housing and coaxial the longitudinal assembly axis;

wherein the first module housing:

defines a first inlet arranged on a second side of the first module housing facing the first side of the third module housing, coaxial the longitudinal assembly axis, and aligned to the first outlet of the third module housing;

defines a second outlet arranged on a third side of the first module housing, opposite the second side, and coaxial the longitudinal assembly axis; and is configured to transiently house the first positioner module configured to receive the food container from the third module housing at the first inlet; and wherein the second module housing:

defines a second inlet arranged on a fourth side of the second module housing facing the third side of the first module housing, coaxial the longitudinal assembly axis, and aligned to the second outlet of the first module housing;

defines a third outlet arranged on a fifth side of the second module housing, opposite the fourth side, and coaxial the longitudinal assembly axis; and is configured to transiently house the second positioner module configured to receive the food container from the first module housing at the second inlet.

16. A food production system comprising:

a food preparation surface arranged at a work surface height and defining a receptacle configured to transiently receive a set of food-dispensing modules configured to store and dispense ingredients for preparation of units of a food product type, the food preparation surface configured for manual preparation of units of the food product type;

a first module housing:

arranged below and supporting the food preparation surface at the work surface height;

defining a first autonomous assembly zone extending along a longitudinal assembly axis;

configured to transiently house a first food-dispensing module, in the set of food-dispensing modules, configured to seat above the longitudinal assembly axis and dispense units of a first ingredient toward the first autonomous assembly zone;

configured to transiently house a cooling module configured to cool ingredients transiently stored in the first food-dispensing module; and comprising a first positioner module arranged within the first autonomous assembly zone, below the first food-dispensing module, and configured to transiently locate a food container below the first food-dispensing module for dispensation of the first ingredient into the food container;

a second module housing:

arranged below and supporting the food preparation surface at the work surface height;

defining a second autonomous assembly zone extending along the longitudinal assembly axis;

configured to transiently house a second food-dispensing module, in the set of food-dispensing modules, configured to seat above the longitudinal assembly axis and dispense units of a second ingredient toward the second autonomous assembly zone;
configured to transiently house a heating module configured to heat ingredients transiently stored in the second food-dispensing module; and
comprising a second positioner module arranged within the second autonomous assembly zone, below the second food-dispensing module, and configured to transiently locate the food container below the second food-dispensing module for dispensation of the second ingredient into the food container; and
a controller configured to:
receive a food order;
coordinate motion of the first positioner module and the second positioner module to selectively locate the food container below the set of food-dispensing modules according to the food order; and
selectively trigger the set of food-dispensing modules to dispense amounts of ingredients into the food container to assemble a unit of the food product type according to the food order.

17. The food production system of claim 16:
wherein the first module housing further comprises a first window:
arranged adjacent the first autonomous assembly zone on a first front side of the first module housing laterally offset the longitudinal assembly axis; and
configured to provide user access to the first autonomous assembly zone; and
wherein the second module housing further comprises a second window:
arranged adjacent the second autonomous assembly zone on a second front side of the second module housing laterally offset the longitudinal assembly axis, the second front side of the second module housing arranged coplanar the first front side of the first module housing; and
configured to provide user access to the second autonomous assembly zone.

18. The food production system of claim 16:
wherein the first module housing defines:
a first dispenser slot extending below the receptacle and arranged along a first rear side of the first module housing above the first autonomous assembly zone; and
a first infrastructure slot arranged adjacent the first dispenser slot, below the food preparation surface, above the first autonomous assembly zone, and along a first front side of the first module housing opposite the first rear side;
wherein the first module housing is configured to:
transiently house the first food-dispensing module within the first dispenser slot; and
transiently house the cooling module within the first infrastructure slot;
wherein the second module housing defines:
a second dispenser slot extending below the receptacle and arranged along a second rear side of the second module housing above the second autonomous assembly zone; and
a second infrastructure slot arranged adjacent the second dispenser slot, below the food preparation surface, above the second autonomous assembly zone, and along a second front side of the second module housing opposite the second rear side; and
wherein the second module housing is configured to:
transiently house the second food-dispensing module within the second dispenser slot; and
transiently house the heating module within the second infrastructure slot.

19. A food production system comprising:
a food preparation surface arranged at a work surface height and defining a receptacle configured to transiently receive a set of food-dispensing modules configured to store and dispense ingredients for preparation of units of a food product type;
a first module housing:
arranged below and supporting the food preparation surface at the work surface height;
defining a first autonomous assembly zone extending along a longitudinal assembly axis;
defining a first dispenser slot extending below the receptacle and arranged along a first rear side of the first module housing above the first autonomous assembly zone;
defining a first infrastructure slot arranged adjacent the first dispenser slot, below the food preparation surface, above the first autonomous assembly zone, and along a first front side of the first module housing opposite the first rear side
configured to transiently house a first food-dispensing module, in the set of food-dispensing modules, configured to:
seat above the longitudinal assembly axis within the first dispenser slot; and
store and dispense units of a first ingredient toward the first autonomous assembly zone;
configured to transiently house a cooling module within the first infrastructure slot, the cooling module configured to cool ingredients transiently stored in the first food-dispensing module;
comprising a first positioner module arranged within the first autonomous assembly zone, below the first food-dispensing module, and configured to transiently locate a food container below the first food-dispensing module for dispensation of the first ingredient into the food container; and
comprising a first window:
arranged adjacent the first autonomous assembly zone on the first front side of the first module housing; and
configured to provide user access to the first autonomous assembly zone; and
a controller configured to:
receive a food order;
coordinate motion of the first positioner module to selectively locate the food container below the first food-dispensing module according to the food order; and
selectively trigger the first food-dispensing module to dispense amounts of the first ingredient into the food container to assemble a unit of the food product type according to the food order.

20. The food production system of claim 19:
further comprising a second module housing:
arranged below and supporting the food preparation surface at the work surface height;
defining a second autonomous assembly zone extending along the longitudinal assembly axis;

defining a second dispenser slot extending below the receptacle and arranged along a second rear side of the first module housing above the second autonomous assembly zone, the second rear side aligned with the first rear side of the first module housing;

defining a second infrastructure slot arranged adjacent the second dispenser slot, below the food preparation surface, above the second autonomous assembly zone, and along a second front side of the second module housing opposite the second rear side, the second front side aligned with the first front side of the first module housing;

configured to transiently house a second food-dispensing module, in the set of food-dispensing modules, configured to:
   seat above the longitudinal assembly axis within the second dispenser slot; and
   store and dispense units of a second ingredient toward the second autonomous assembly zone;

configured to transiently house a heating module within the second infrastructure slot, the heating module configured to heat ingredients transiently stored in the second food-dispensing module;

comprising a second positioner module arranged within the second autonomous assembly zone, below the second food-dispensing module, and configured to transiently locate the food container below the second food-dispensing module for dispensation of the second ingredient into the food container; and comprising a second window:
   arranged adjacent the second autonomous assembly zone on the second front side; and
   configured to provide user access to the second autonomous assembly zone; and wherein the controller is further configured to:
   coordinate motion of the second positioner module to selectively locate the food container below the second food-dispensing module according to the food order; and
   selectively trigger the second food-dispensing module to dispense amounts of the second ingredient into the food container to assemble the unit of the food product type according to the food order.

* * * * *